United States Patent
Kim et al.

(10) Patent No.: US 8,922,625 B2
(45) Date of Patent: Dec. 30, 2014

(54) MOBILE TERMINAL AND CONTROLLING METHOD THEREOF

(75) Inventors: Tae Ho Kim, Seoul (KR); Yi Seon Jeong, Anyang-si (KR); Duck Moon Shin, Gwangmyeong-si (KR); Woon Phil Kim, Seoul (KR); Hyun Jun Yang, Daegu (KR); Min Hun Kang, Seoul (KR); Jung Wan Kang, Seoul (KR); Hye Sook Lee, Uijeongbu-si (KR); Yong Jun Kim, Seoul (KR); Min Keun Woo, Seoul (KR); Su Cheoul Kim, Goyang-si (KR); Won Taek Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 436 days.

(21) Appl. No.: 12/949,570

(22) Filed: Nov. 18, 2010

(65) Prior Publication Data
US 2011/0117958 A1      May 19, 2011

(30) Foreign Application Priority Data

Nov. 19, 2009  (KR) ................. 10-2009-0111940
Nov. 23, 2009  (KR) ................. 10-2009-0113290
Feb. 8, 2010   (KR) ................. 10-2010-0011285

(51) Int. Cl.
| | |
|---|---|
| *H04W 88/02* | (2009.01) |
| *H04N 13/00* | (2006.01) |
| *G06K 9/00* | (2006.01) |
| *H04N 13/04* | (2006.01) |
| *G03B 35/10* | (2006.01) |
| *H04N 13/02* | (2006.01) |
| *H04M 1/02* | (2006.01) |
| *H04N 1/00* | (2006.01) |

(52) U.S. Cl.
CPC .......... *H04M 1/0264* (2013.01); *H04M 1/0208* (2013.01); *H04M 2250/20* (2013.01); *H04N 13/0413* (2013.01); *H04N 1/00307* (2013.01); *H04M 1/0237* (2013.01); *G03B 35/10* (2013.01); *H04N 13/0452* (2013.01); *H04N 13/0239* (2013.01); *H04M 1/0216* (2013.01); *H04N 13/0497* (2013.01)
USPC ........................................................ 348/47

(58) Field of Classification Search
USPC ........... 348/115, 143, 207.2, 47, 48; 382/154; 600/427; 439/699.1
See application file for complete search history.

(56) References Cited

U.S. PATENT DOCUMENTS

| | | | | |
|---|---|---|---|---|
| 5,244,420 A | * | 9/1993 | Lopata | .................. 439/699.1 |
| 6,323,903 B1 | * | 11/2001 | Poulsen et al. | ................ 348/373 |
| 7,797,430 B2 | * | 9/2010 | Ichieda | .................. 709/227 |
| 8,286,098 B2 | * | 10/2012 | Ju et al. | .................. 715/849 |

(Continued)

*Primary Examiner* — Y Lee
*Assistant Examiner* — Salame Amr
(74) *Attorney, Agent, or Firm* — KED & Associates LLP

(57) ABSTRACT

A mobile terminal is provided that includes a first camera to obtain a first image of an object, and a second camera to obtain a second image of an object, the second camera being separated from the first camera by a distance d. The mobile terminal also includes a controller to determine the distance d between the first camera and the second camera when the first camera obtains the first image of the object at a same time that the second camera obtains the second image. Still further, the mobile terminal includes a varying device to allow the distance d between the first camera and the second camera to vary, and a display to display a combination of the first image and the second image to allow a perceived three-dimensional (3D) image of the object.

16 Claims, 24 Drawing Sheets

(56) References Cited

U.S. PATENT DOCUMENTS

| | | |
|---|---|---|
| 2003/0103145 A1* | 6/2003 | Ejima et al. ................. 348/207.2 |
| 2003/0108236 A1* | 6/2003 | Yoon ............................. 382/154 |
| 2004/0085447 A1* | 5/2004 | Katta et al. .................... 348/143 |
| 2004/0141157 A1* | 7/2004 | Ramachandran et al. ...... 353/70 |
| 2008/0266389 A1* | 10/2008 | DeWind et al. ............... 348/115 |
| 2010/0041431 A1* | 2/2010 | Kim et al. .................. 455/550.1 |
| 2010/0271462 A1* | 10/2010 | Gutierrez Novelo ........... 348/43 |
| 2010/0302799 A1* | 12/2010 | Rosberg et al. ............... 362/602 |

* cited by examiner

FIG. 3
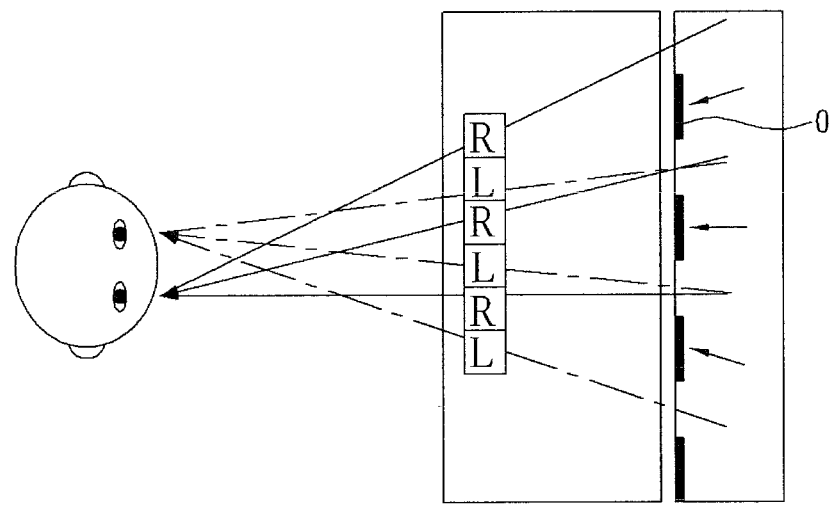
(a)
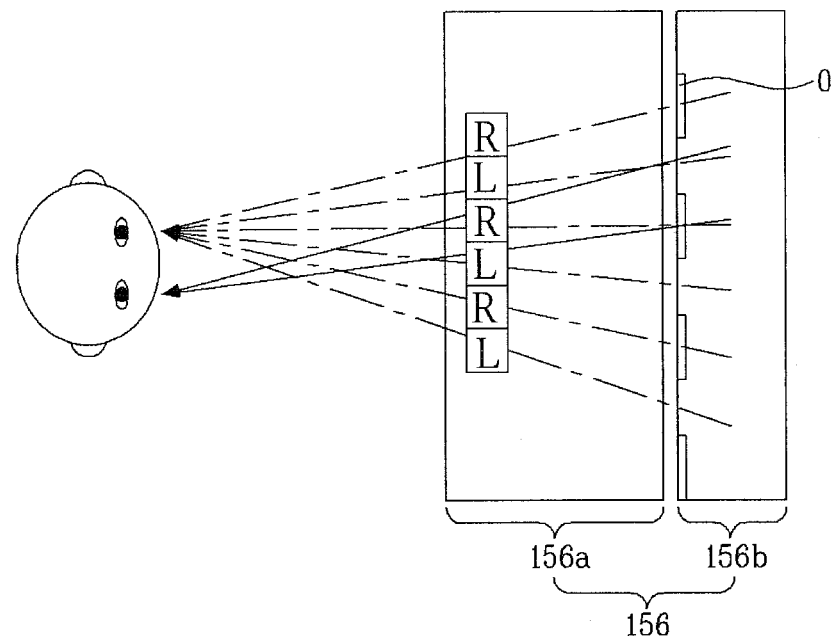
(b)

FIG. 6
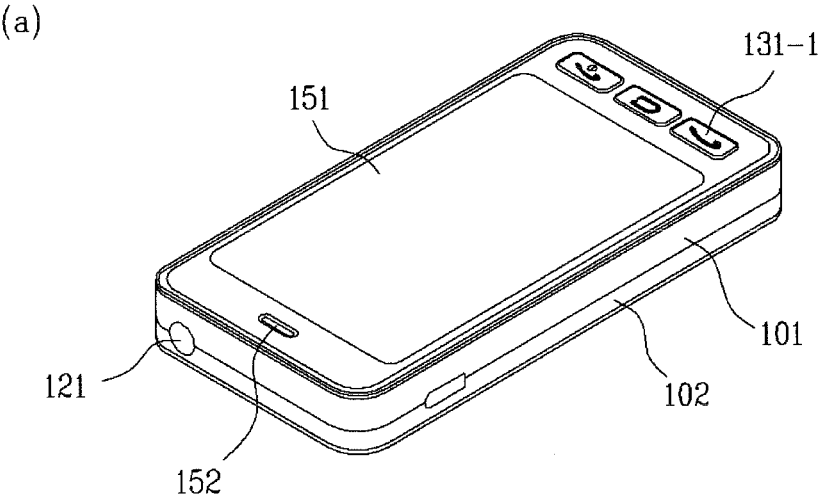
(a)
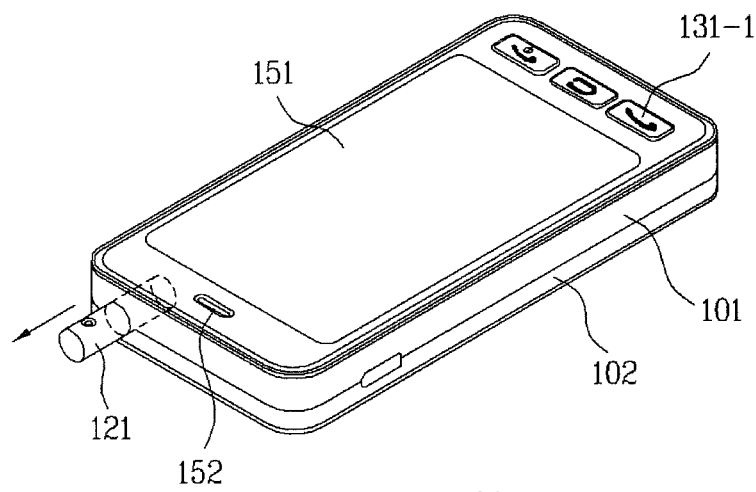
(b)
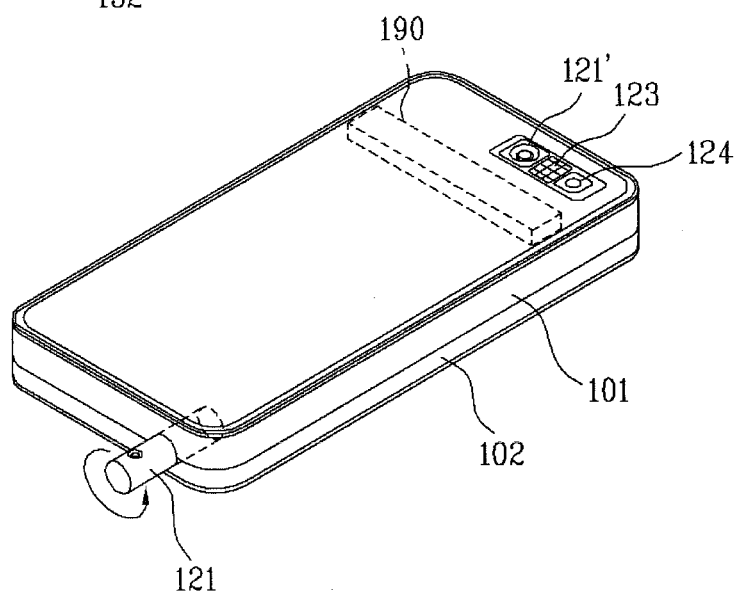
(c)

FIG. 9
(a)
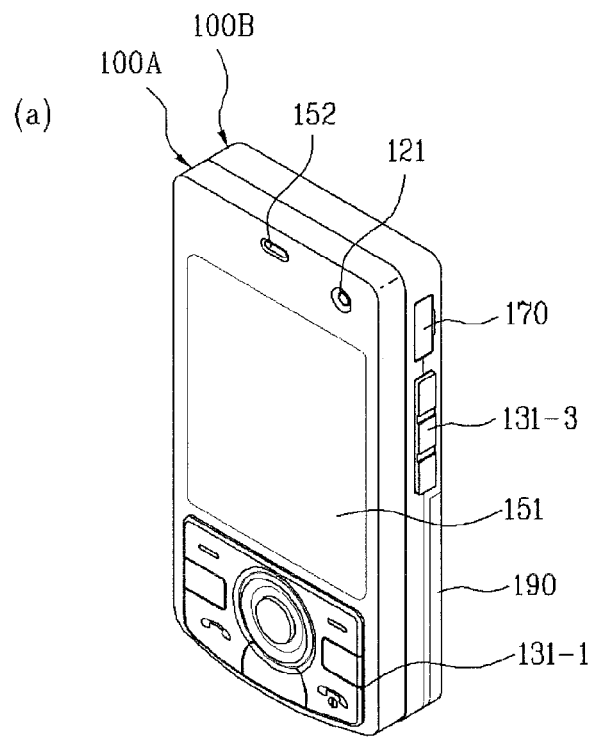
(b)
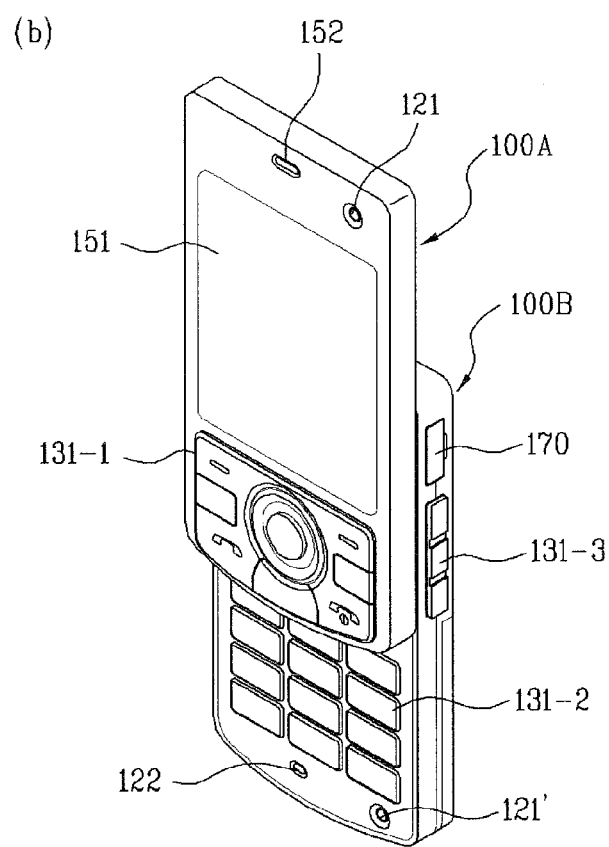

FIG. 10
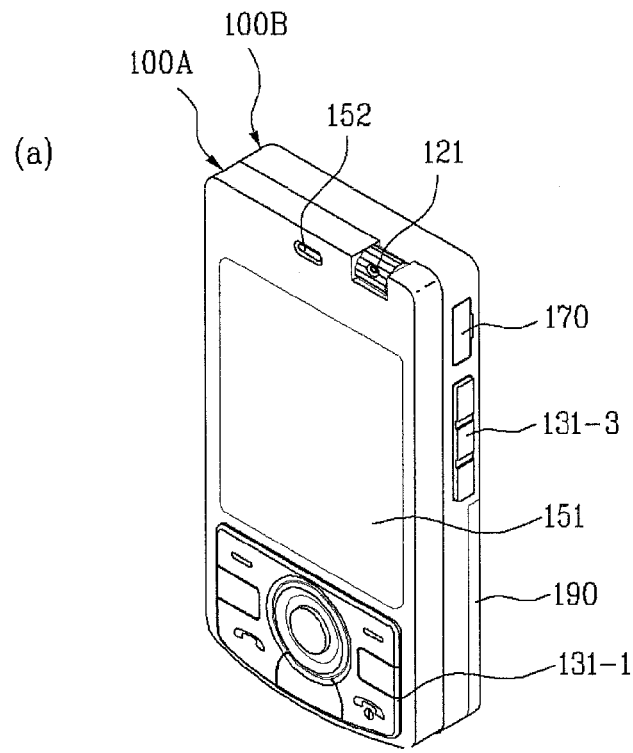
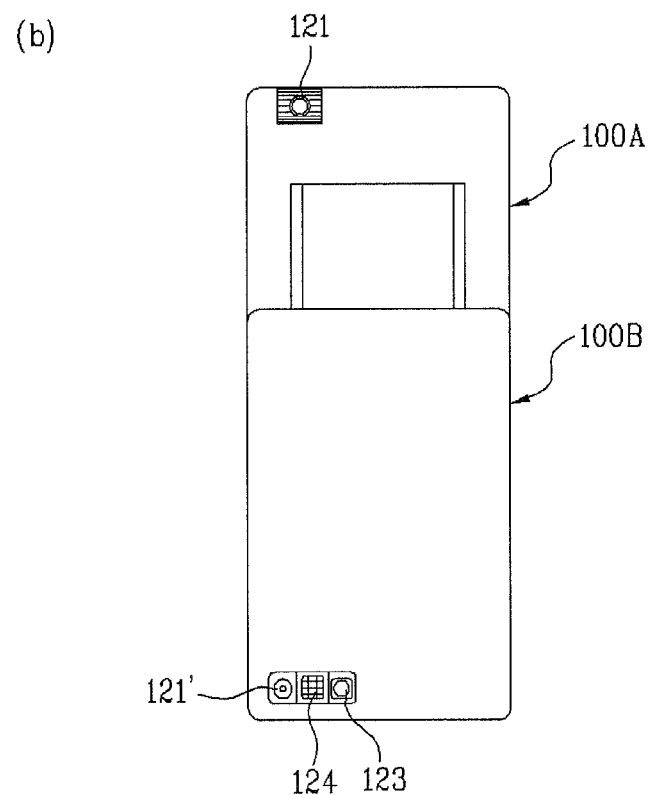

FIG. 11
(a)
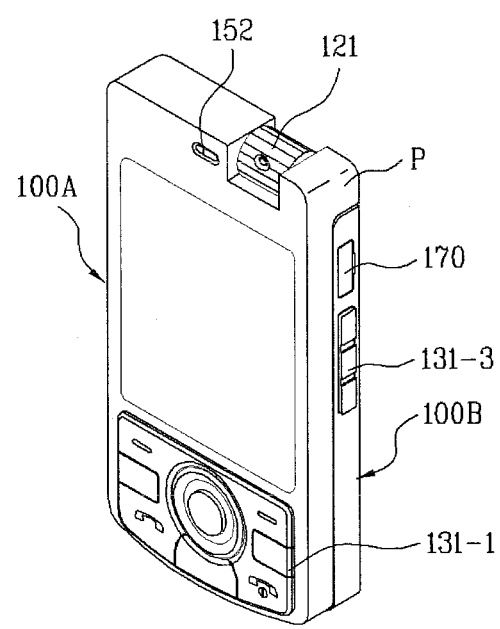
(b)
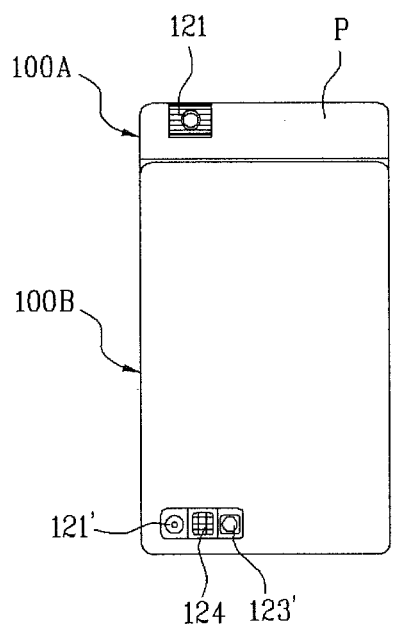
(c)
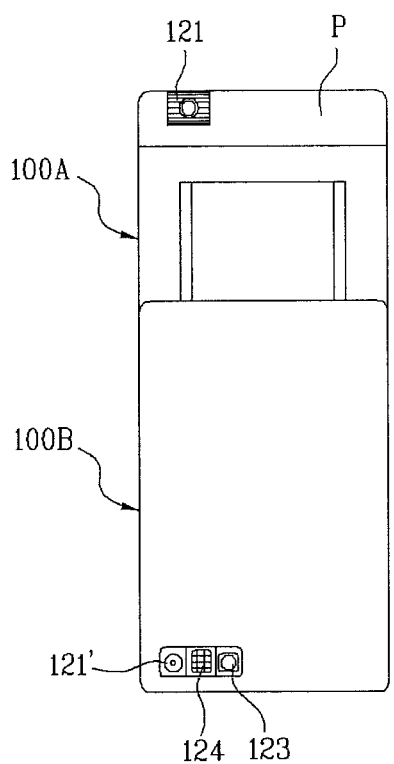

FIG. 12
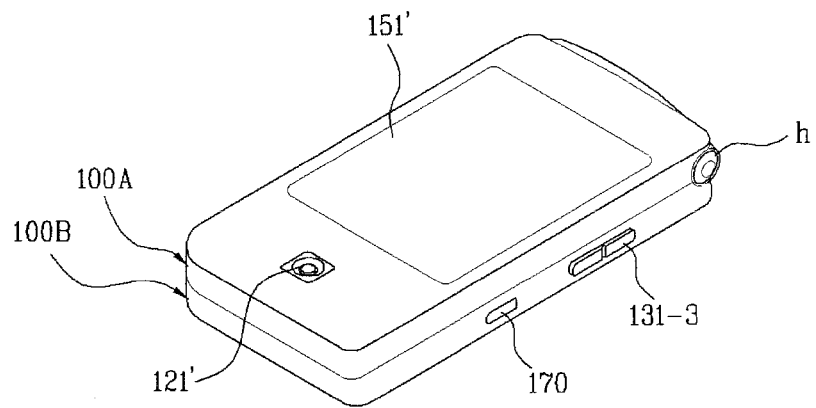
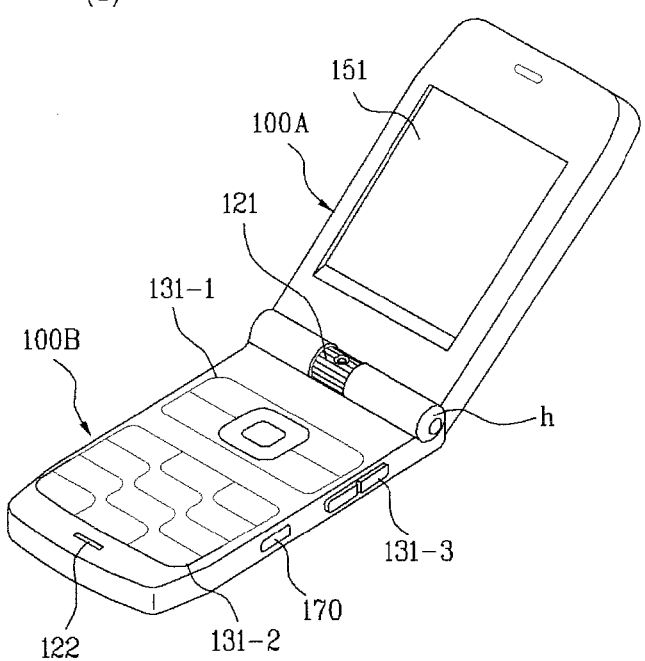
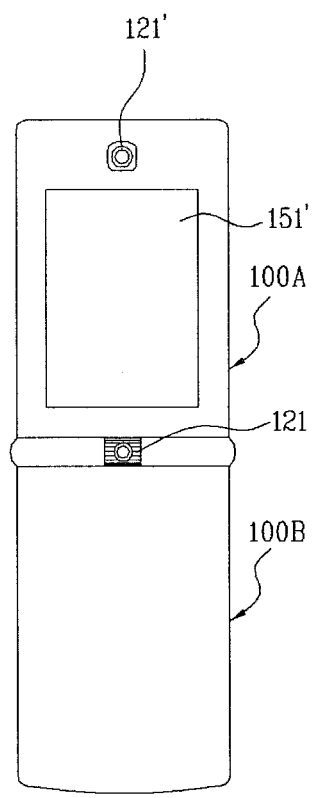

FIG. 15
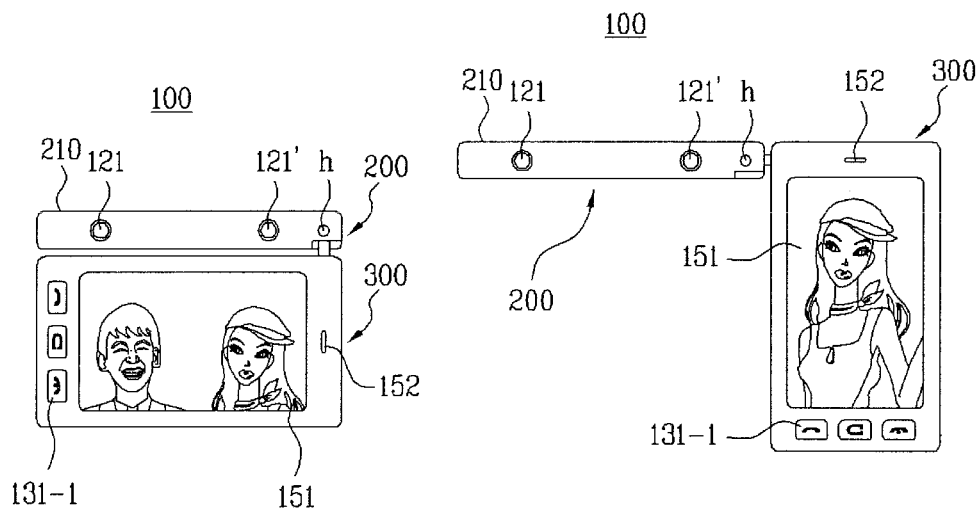
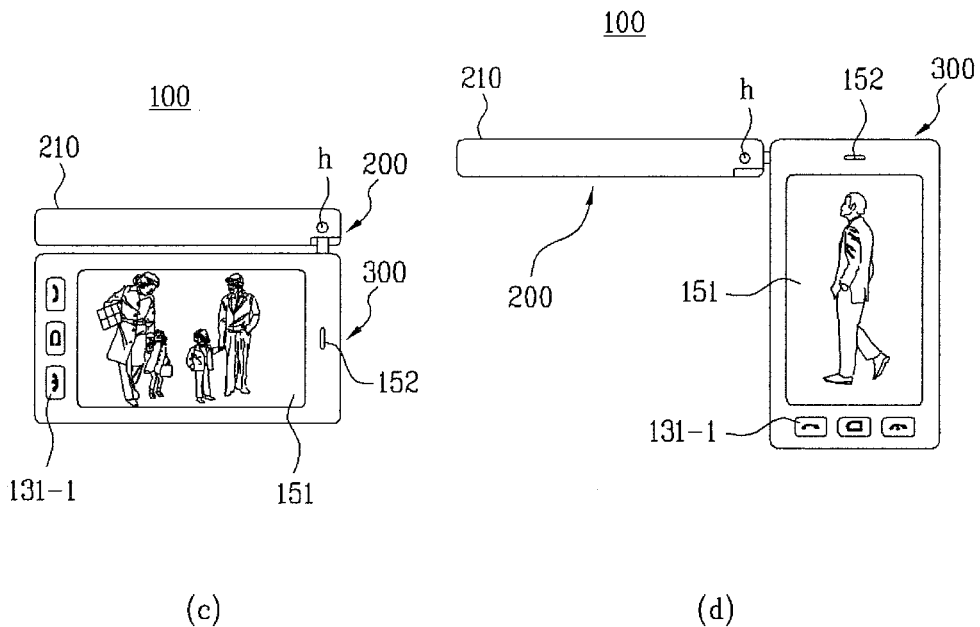

FIG. 16
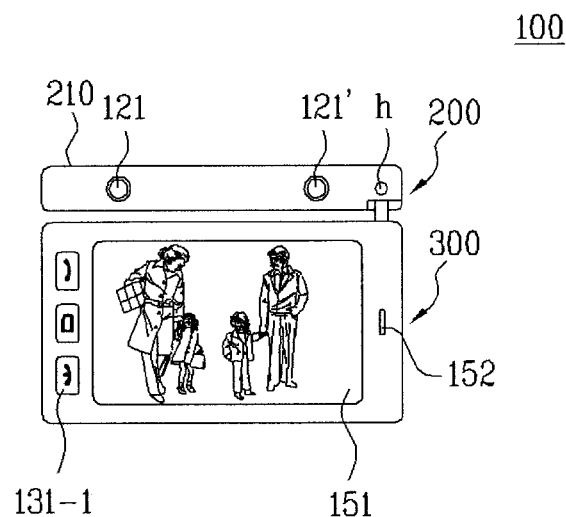
(a)
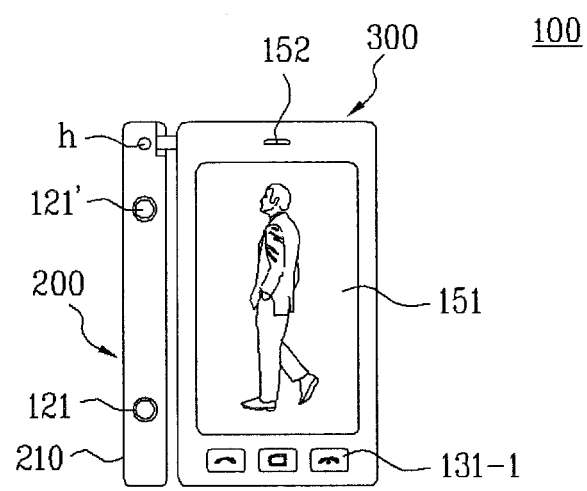
(b)

FIG. 20B
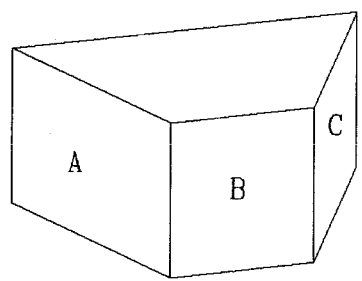 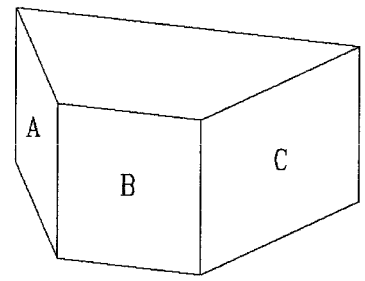
<left eye>  <right eye>
FIG. 20C
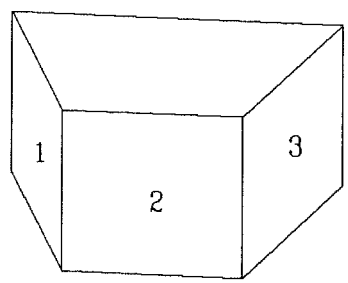 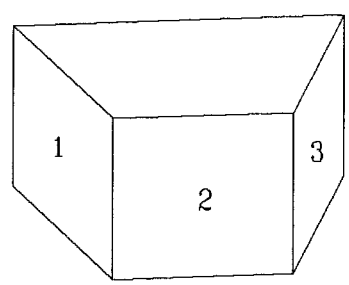
<left eye>  <right eye>

FIG. 21
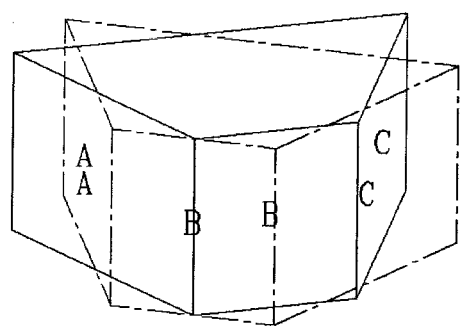
(a)
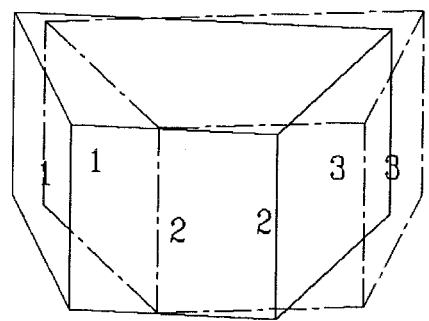
(b)

MOBILE TERMINAL AND CONTROLLING METHOD THEREOF

CROSS-REFERENCE TO RELATED APPLICATION(S)

Pursuant to 35 U.S.C. §119(a), this application claims the benefit of earlier filing date and right of priority to Korean Application Nos. 10-2009-0111940, filed on Nov. 19, 2009, 10-2009-0113290, filed on Nov. 23, 2009 and 10-2010-0011285, filed on Feb. 8, 2010, the contents of which are hereby incorporated by reference herein in their entirety.

BACKGROUND

1. Field

The present invention relates to a mobile terminal, and more particularly, to a mobile terminal and controlling method thereof. Although the present invention is suitable for photographing a 3D image of stereoscopy via a mobile terminal and enjoying the 3D image photographed via the mobile terminal.

2. Background

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example. To support and increase of the terminal functions, it may be able to consider the improvement of structural parts and/or software parts of the terminal.

Recently, many attentions are ongoing to be paid to the 3D image photographing and/or displaying technology. Therefore, the demand for a method of photographing and/or displaying a 3D image of stereoscopy in a mobile terminal is ongoing to rise.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram for concept of a sense of distance and 3D depth;

FIG. 6 is a diagram for one example of configuration of a mobile terminal according to one embodiment of the present invention;

FIG. 9 is a diagram for one example of configuration of a mobile terminal according to one embodiment of the present invention;

FIG. 10 is a diagram for one example of configuration of a mobile terminal according to one embodiment of the present invention;

FIG. 11 is a diagram for one example of configuration of a mobile terminal according to one embodiment of the present invention;

FIG. 12 is a diagram for one example of configuration of a mobile terminal according to one embodiment of the present invention;

FIG. 15 is a diagram for explaining a use mode of a mobile terminal according to another embodiment of the present invention;

FIG. 16 is a diagram for explaining play modes for playing back an image stored in a mobile terminal according to another embodiment of the present invention;

FIGS. 20A to 20C are diagrams for images photographed via a binocular camera in accordance with a distance of a subject according to a further embodiment of the present invention;

FIG. 21 is a diagram of images generated from overlapping the images photographed via the binocular camera shown in FIG. 20B and FIG. 20C with each other according to a further embodiment of the present invention;

DETAILED DESCRIPTION

Figure 1:
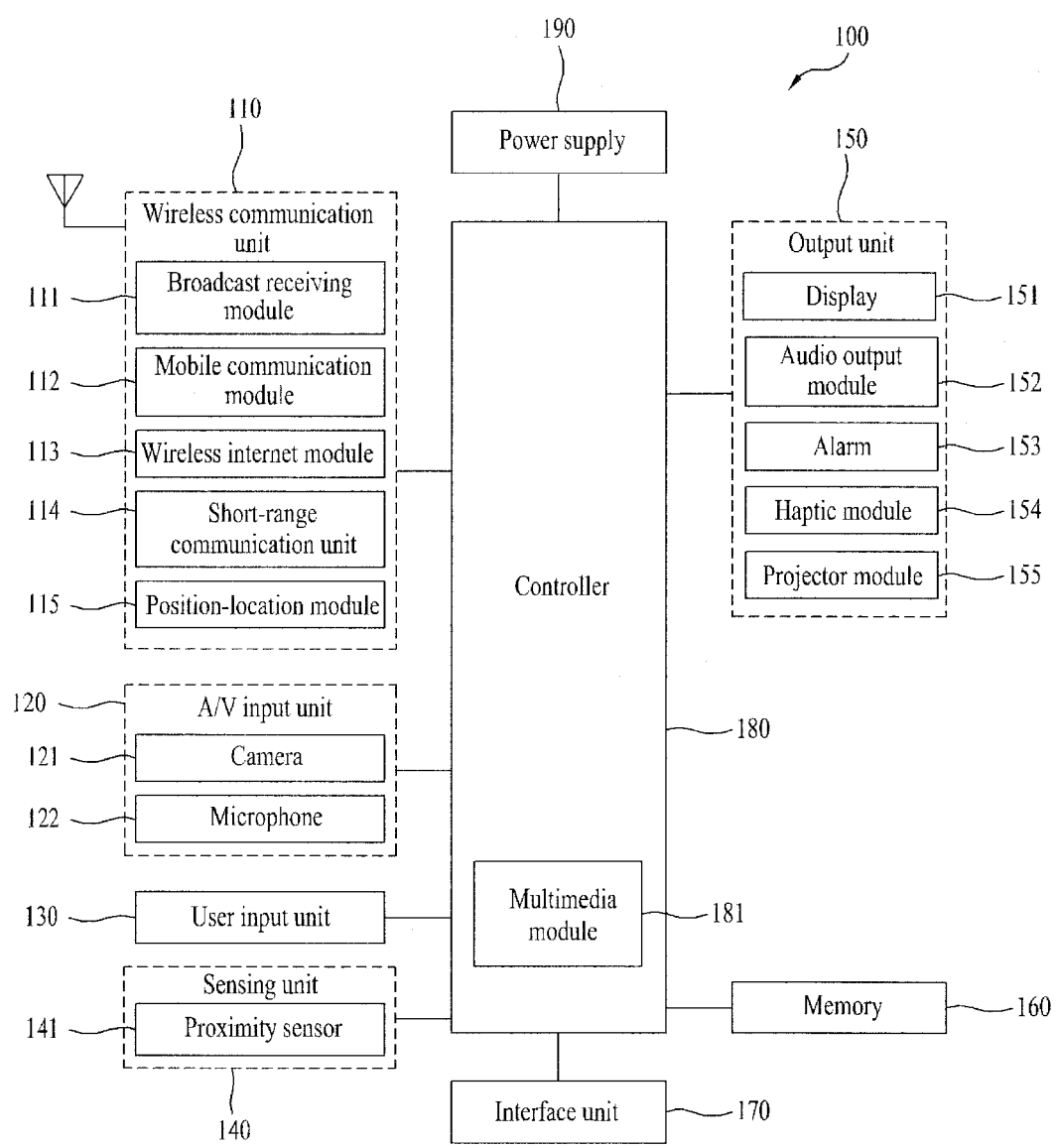
FIG. 1 is a block diagram of a body of a mobile terminal according to one embodiment of the present invention.

Accordingly, the present invention is directed to a mobile terminal and controlling method thereof that substantially obviate one or more problems due to limitations and disadvantages of the related art.

An object of the present invention is to provide a mobile terminal and controlling method thereof, by which a 3D image photographing is further facilitated.

Another object of the present invention is to provide a mobile terminal and controlling method thereof, by which 3D depth information of a subject for photography can be provided to a user in various ways on 3D image photographing.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a first camera configured to photograph a first image including at least one subject at a first view, a second camera configured to photograph a second image including the at least one subject at a second view, the second camera arranged by being spaced apart from the first camera in a prescribed distance, a display unit configured to display at least one selected from the group consisting of the first image, the second image and a 3D stereoscopic image generated from synthesizing the first image and the second image together, and a controller determining a 3D (3-dimensional) level according to a parallax between the first view and the second view for at least one of the at least one subject using the first image and the second image, the controller controlling the determined 3D level to be displayed via the display unit.

In another aspect of the present invention, a method of controlling a mobile terminal according to the present invention includes the steps of activating a first camera configured to photograph a first image including at least one subject at a first view and a second camera configured to photograph a second image including the at least one subject at a second view, the second camera arranged by being spaced apart from the first camera in a prescribed distance, displaying at least one selected from the group consisting of the first image, the second image and a 3D stereoscopic image generated from synthesizing the first image and the second image together on a display unit, determining a 3D (3-dimensional) level according to a parallax between the first view and the second view for at least one of the at least one subject using the first image and the second image, and displaying the determined 3D level via the display unit.

In another aspect of the present invention, a mobile terminal according to one embodiment of the present invention includes at least one case, a display unit provided to the at least one case, at least one user input unit, at least two cameras provided to positions spaced from each other, and a control unit controlling image information photographed via at least two of the at least two cameras to be converted to a 3D image. In this case, at least one of the at least two cameras is rotatably loaded in the case to change its photographing direction.

In another aspect of the present invention, a mobile terminal includes a first body having a display unit configured to display a 3D image, a second body slidably assembled with the first body, the second body having at least one user input unit, a first camera provided to the first body, a second camera provided to the second body, and a control unit converting image information photographed via the first and second cameras to the 3D image.

In another aspect of the present invention, a mobile terminal includes a display unit configured to display a 3D image, at least one user input unit, at least two cameras, and a control unit converting image information photographed via at least two of the at least two cameras to the 3D image. And, at least one of the at least two cameras is can be displaced to adjust a distance between the at least two cameras.

In a further aspect of the present invention, a mobile terminal includes a body having a display unit for displaying a 3D image, a photographing unit having a first camera for photographing a left eye image and a second camera for photographing a right eye image, the photographing unit connected to the body in a manner of having an adjustable connection angle, and a control unit controlling an image photographed by the photographing unit or an image stored in a memory to be displayed on the display unit 3-dimensionally, the control unit controlling the display unit to display a horizontal image or a vertical image 3-dimensionally.

Accordingly, the present invention provides the following effects and/or advantages.

First of all, a user is further facilitated to photograph a 3D image via a mobile terminal according to at least one embodiment of the present invention.

Secondly, the present invention informs a user of 3D depth of a subject in advance on 3D image photographing, thereby facilitating the user to predict a result of the photographing.

It is to be understood that both the foregoing general description and the following detailed description of the present invention are exemplary and explanatory and are intended to provide further explanation of the invention as claimed.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the A/V (audio/video) input unit 120 is provided for an audio/video signal input and can include a camera 121, a microphone 122 and the like. Optionally, the mobile terminal 100 includes at least two cameras 121 to configure a photographing unit 200 (not shown in the drawing). In particular, the photographing unit 200 can include a first camera configured to photograph a left eye image and a second camera configured to photograph a right eye image. In this case, the photographing unit 200 is able to process an image frame of a still picture, a moving picture or the like, which is obtained by an image sensor in a video call mode or a photographing mode. And, the processed image frame can be displayed on the display unit 141. In this case, the display unit 151 can include such a display unit 151 capable of displaying a 3D image thereon, which shall be described in the following description.

For instance, the display unit 151 can include a display configured to display a 3D image by one of parallax barrier system, lenticular system, polarizing system, active shutter system and the like.

Unlike a general 3D display, the display unit 151 of the present invention displays a horizontal image 3-dimensionally in a manner of positioning the display unit 151 in a horizontal direction or is able to display a vertical image 3-dimensionally in a manner of positioning the display unit 151 in a vertical direction. In particular, unlike the conventional displays capable of displaying a 3D image limited to a vertical image of a photographed image only, the display unit 151 of the present invention is characterized in displaying images 3-dimensionally no matter what the photographed image is a vertical or horizontal image. This shall be described in detail later in this disclosure.

The image frame photographed via the photographing unit 200 is stored in the memory 160 or can be externally transmitted via the wireless communication unit 110. Moreover, at least two or more cameras can be provided according to environment of use.

Thus, at least two or more cameras can be provided to the mobile terminal 100 according to the present invention in a manner of being located at the photographing unit 200 by being spaced apart from each other to enable the 3D photographing. This shall be described in detail later in this disclosure.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or a non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

As mentioned in the foregoing description, the mobile terminal 100 according to the present invention is provided with at least two cameras to photograph a 3D image and is further able to include the display unit 151 capable of displaying the 3D image.

Meanwhile, 3D images implemented on the display unit 151 of the mobile terminal 100 according to the present invention can be mainly classified into two kinds of categories. In this case, the reference of this classification relates to whether different eyes are provided to both eyes. The first 3D image category is described as follows, First of all, the first category is a monoscopic scheme of providing the same image to both eyes and is advantageous in that it can be implemented with a general display unit 151. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151. Therefore, such a 3D image can substantially include a planar image (2D image).

Secondly, the second category is a stereoscopic scheme of providing different image to both eyes, respectively, which uses the principle that a user can sense a stereoscopic effect in looking at an object with human eyes. In particular, human eyes are configured to see different planar images in looking at the same object due to a distance between both eyes. These different images are forwarded to a human brain via retinas. The human brain is able to sense depth and reality of a 3D image by combining the different images together. Therefore, the binocular disparity attributed to the distance between both of the eyes enables the user to sense the stereoscopic effect despite that there is an individual difference of the binocular disparity more or less. Therefore, the binocular disparity becomes the most important factor of the second category. The binocular disparity is explained in detail with reference to FIG. 2 as follows.

Figure 2:
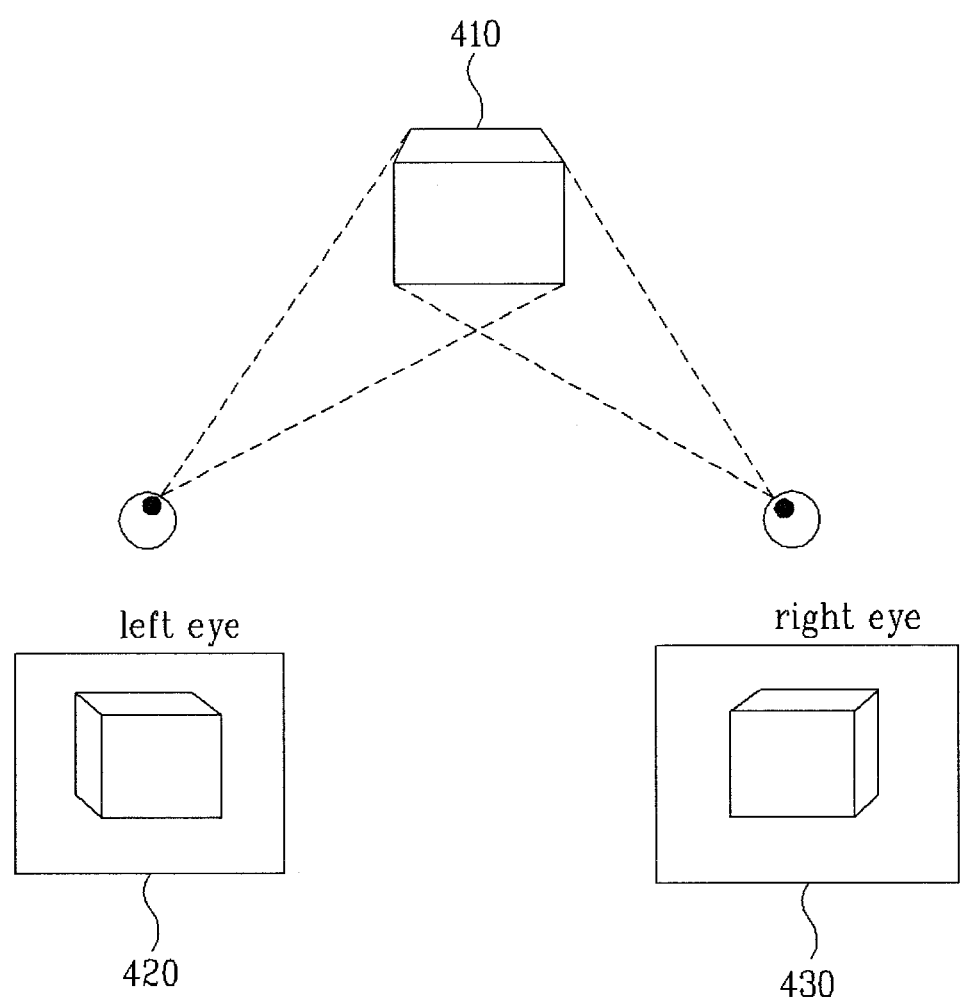
FIG. 2 is a diagram for explaining the principle of binocular disparity.

FIG. 2 is a diagram for explaining the principle of binocular disparity.

Referring to FIG. 2, assume a situation that a hexahedral object O is positioned as a subject in front below an eye's height to be seen through human eyes. In this case, a left eye is able to see a left eye planar image 420 revealing three facets including a top side, a front side and a left lateral side only. And, a right eye is able to see a right eye planar image 430 revealing three facets including the top side, the front side and a right lateral side only.

Even if a real thing is not actually positioned in front of both eyes of a user, if the left eye planar image 420 and the right eye planar image 430 are set to arrive at the left eye and the right eye, respectively, a user is able to substantially sense the object O as if looking at the object O actually.

Thus, in order to implement the 3D image belonging to the second category in the mobile terminal 100, images of the same object should arrive at both eyes in a manner of being discriminated from each other for the left and right eye images of the same object with a predetermined parallax.

In the following description, 3D depth attributed to the binocular disparity (parallax) is explained with reference to FIG. 3.

FIG. 3 is a diagram for concept of a sense of distance and 3D depth.

Referring to FIG. 3, a lateral side ratio of an image entering each eyeball in view of an object O in a distance d1 trough both eyes is relatively higher than that in a distance d2, whereby a difference between images seen through both eyes increases. Moreover, an extent of a stereoscopic effect sensed by a user in view of the object O in the distance d1 can become higher than that in view of the object O in the distance d2. In particular, when a thing is seen through both eyes of a user, a closer subject gives a greater stereoscopic effect, whereas a farther subject gives a smaller stereoscopic effect.

When one object O is observed through both eyes of human body, a distance between both of the human eyes are fixed. Yet, if a distance between a camera for photographing a left eye image and a camera for photographing a right eye image is increased to implement a 3D image, it is able to increase the stereoscopic effect of the 3D image with the increasing distance between the two cameras due to the same reason. As the distance S2 between both eyes is greater than the distance S1, it is able to increase the stereoscopic effect. If the distance between both eyes is increased, it brings such an effect as decreasing a distance between the object O and each of the eyes. Therefore, in case of photographing to implement a 3D image, the condition for enhancing the stereoscopic effect can be set as follows. First of all, if a distance between both eyes is fixed, a distance d from an object O is decreased or a distance s between both eyes is increased.

Such a difference in stereoscopic effect can be digitized into a 3D depth or a 3D level. In the following description of this disclosure, a high stereoscopic effect of a thing located at a closer position shall be represented as a low 3D depth or a low 3D level. And, a low stereoscopic effect of a thing located at a farther position shall be represented as a high 3D depth or a high 3D level. Since such a definition of the 3D depth or level is relatively set, its classification reference or its increasing/decreasing direction is changeable.

For clarity and convenience of the following description, in order to discriminate the above mentioned two categories from each other, a 3D image in the first category shall be named a 2D stereoscopic image and a 3D image in the second category shall be named a 3D stereoscopic image. A method of implementing a 3D stereoscopic image is described as follows.

As mentioned in the following description, in order to implement a 3D stereoscopic image, an image for a right eye and an image for a left eye need to arrive at both eyes in a manner of being discriminated from each other. For this, various methods are explained as follows.

1) Parallax Barrier Scheme

The parallax barrier scheme enables different images arrive at both eyes in a manner of controlling a propagating direction of light by electronically driving a cutoff device provided between a general display and both eyes. This is explained with reference to FIG. 4 as follows.

Figure 4:
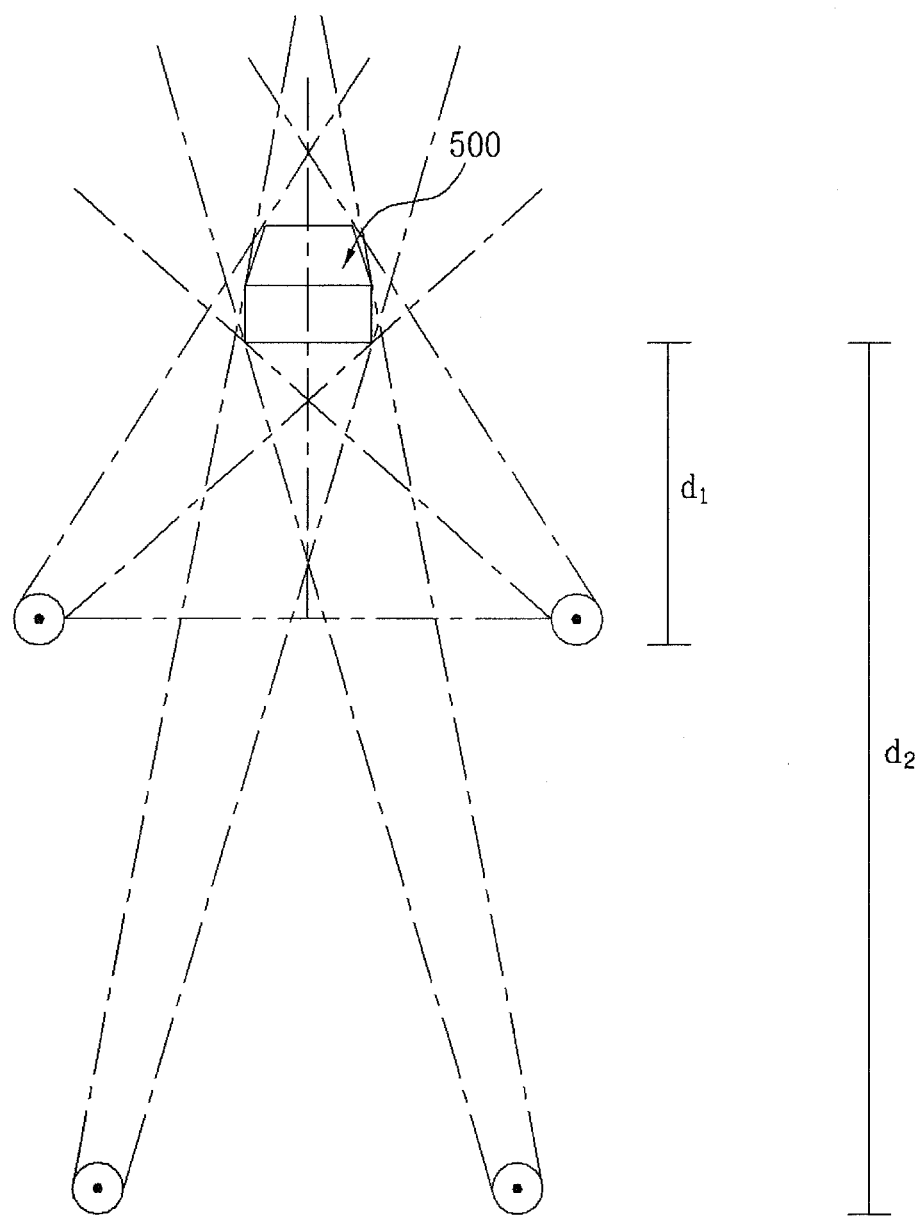
FIG. 4 is a diagram for a scheme of implementing a 3D stereoscopic image in a display unit of a parallax barrier type applicable to embodiments of the present invention.

FIG. 4 is a diagram for a scheme of implementing a 3D stereoscopic image in a display unit of a parallax barrier type applicable to embodiments of the present invention.

Referring to FIG. 4, a structure of a parallax barrier type display unit 151 for displaying a 3D image can be configured in a manner that a general display device 151a is combined with a switch LC (liquid crystals) 151b. A propagating direction of light is controlled by activating an optical parallax barrier 600, as shown in FIG. 4(a), using the switch LC 151b, whereby the light is separated into two different lights to arrive at left and right eyes, respectively. Thus, when an image generated from combining an image for the right eye and an image for the left eye together is displayed on the display device 151*a*, a user sees the images corresponding to the eyes, respectively, thereby feeling the 3D or stereoscopic effect.

Alternatively, referring to FIG. 4(*b*), the parallax barrier 600 attributed to the switch LC is electrically controlled to enable entire light to be transmitted therethrough, whereby the light separation due to the parallax barrier is avoided. Therefore, the same image can be seen through left and right eyes. In this case, the same function of a conventional display unit is available.

In particular, FIG. 4 exemplarily shows that the parallax barrier performs parallel translation in one axial direction, by which the present invention is non-limited. Alternatively, the present invention is able to use a parallax barrier that enables parallel translation in at least two axial directions according to a control signal from the controller 180.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

Mobile Terminal for 3D Stereoscopic Image Photography

First of all, in order to display a 3D stereoscopic image (e.g., a still image, a moving picture, etc.) through at last one of the above mentioned 3D stereoscopic image implementing methods, a mobile terminal needs to be provided with a left eye image and a right eye image. For this, according to embodiments of the present invention, at least two cameras are provided to a mobile terminal in a manner of being spaced apart from each other in a prescribed distance. The same object is simultaneously photographed using the at least two cameras to generate a left eye image and a right eye image for a 3D spectroscopic image.

In this case, the at least two cameras are positioned by being spaced apart from each other in a prescribed distance. This is to generate a left eye image and a right eye image with the binocular disparity, described with reference to FIG. 2 and FIG. 3, via the corresponding cameras, respectively.

Thus, it is able to provide a stereoscopic 3D mage by combining the left eye image and the right eye image together.

In the following description, a mobile terminal according to the present invention is explained with reference to FIG. 5.

Figure 5:
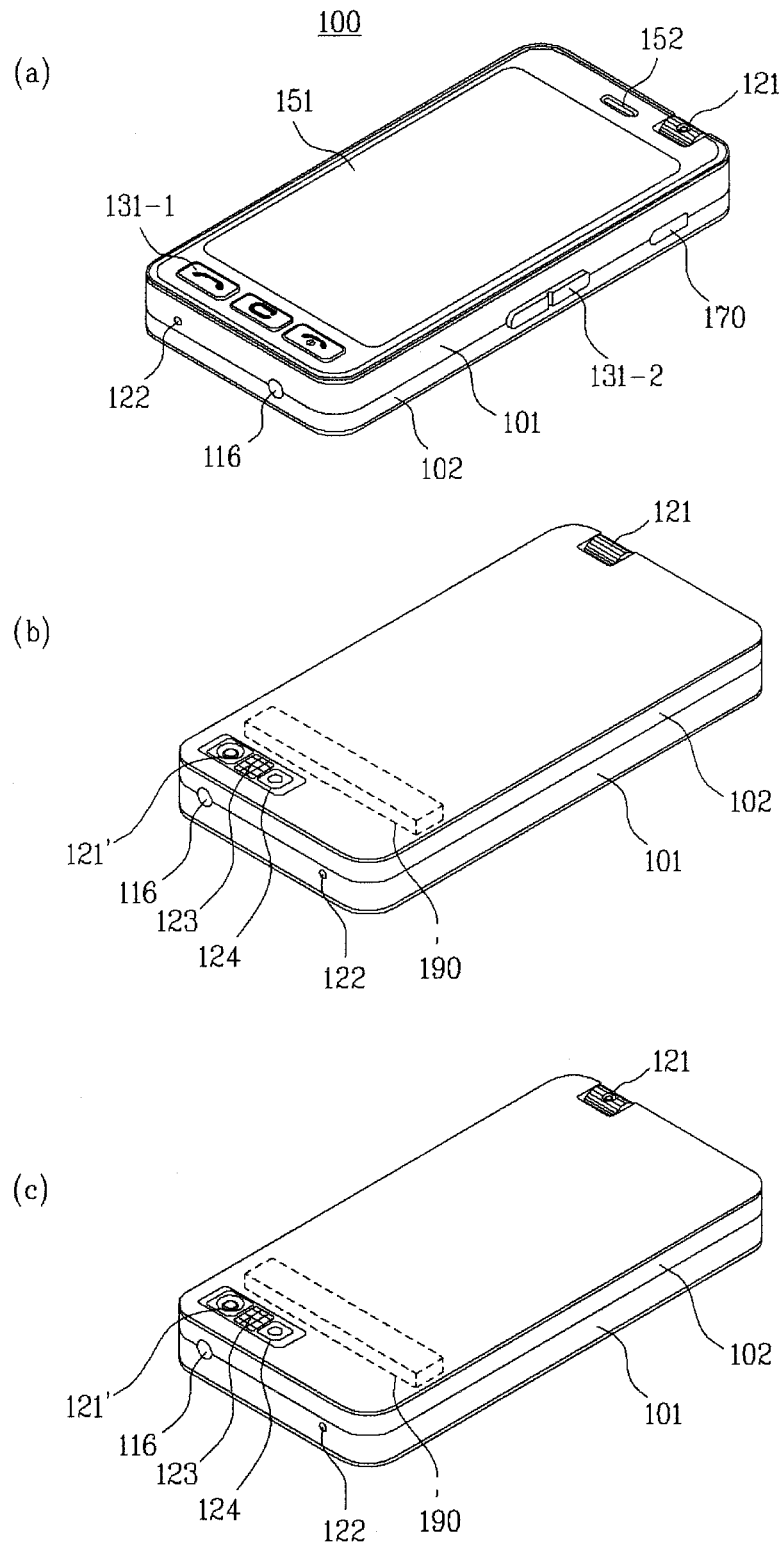
FIG. 5 is a diagram for one example of configuration of a mobile terminal according to one embodiment of the present invention.

FIG. 5 is a diagram for one example of configuration of a mobile terminal according to one embodiment of the present invention. In particular, FIG. 5(*a*) is a front perspective diagram of a mobile terminal according to one embodiment of the present invention, FIG. 5(*b*) is a rear perspective diagram of a mobile terminal according to one embodiment of the present invention, and FIG. 5(*c*) is a rear perspective diagram of a mobile terminal according to one embodiment of the present invention, in which another operational status of the mobile terminal is shown.

First of all, a mobile terminal according to one embodiment of the present invention includes at least one case, a display unit provided to the at least one case, at least one user input unit, at least two cameras provided to positions spaced from each other, and a control unit controlling image information photographed via at least two of the at least two cameras to be converted to a 3D image. In this case, at least one of the at least two cameras is rotatably loaded in the case to change its photographing direction.

The mobile terminal 100 terminal 100 shown in FIG. 5 includes a terminal body of a bar type, by which the present invention is non-limited. And, the present invention is applicable to such a structure, which enabling at least two bodies to be connected to each other in a manner of moving relatively, as a slide type, a folder type, a swing type, a swivel type and the like. And, the slide type and the folder type shall be described in the later description.

The body of the mobile terminal 100 includes a case (e.g., a casing, a housing, a cover, etc.) forming an exterior. According to the present embodiment, the case can be divided into a front case 101 and a rear case 102. Various electric and electronic components are loaded in a space provided between the front case 101 and the rear case 102. Optionally, at least one middle case can be additionally provided between the front case 101 and the rear case 102.

The case is formed by injection molding of synthetic resin or can be formed of such a metal substance as stainless steel (STS), titanium (Ti) and the like.

A display unit 151, an audio output module 152, a camera 121, a user input unit 130 (131, 132), a microphone 122 and the like can be provided to the terminal body, and more particularly, to the front case 101. The display unit 151 mostly occupies a main surface of the front case 101. The audio output unit 152 can be provided to a region adjacent to one of both end portions of the display unit 151. A first camera 121 is rotatably provided to the one end portion. And, the first user input unit 131, the microphone 122 and the like can be provided to a region adjacent to the other end portion. Moreover, the user input unit 132, the interface 170 and the like can be provided to lateral sides of the front case 101 and the rear case 102.

The user input unit 130 is manipulated to receive an input of a command for controlling an operation of the mobile terminal 100. And, the user input unit 130 is able to include a plurality of manipulating units. Moreover, the user input unit 130 can include a first user input unit 131 and a second input unit 132 according to functionality.

The user input units 131 and 132 can be generally named manipulating portions. And, the manipulating portions can adopt any mechanism having a tactile manner that enables a user to perform manipulation with tactile feeling.

Contents inputted through the first or second user input unit 131 or 132 can be set in various ways. The first user input unit 131 receives such a command as start, end, scroll and the like, while the second user input unit 132 receives such a command as a volume adjustment of sound outputted from the audio output unit 152, a switching to a touch recognizing mode of the display unit 151, and the like.

Referring to FIG. 5(b), a second camera 121' can be additionally provided to the backside of the terminal body, and more particularly, to the rear case 102. Unlike the first camera 121 (cf. FIG. 2A), the second camera 121' can be provided in a manner of being fixed to the case. In particular, it is unable to change the photographing direction of the second camera 121'. Since the first camera 121 is rotatably provided, while the first camera 121 is rotated, the first camera 121 and the second camera 121' can photograph a left eye image and a right eye image. In particular, as the first camera 121 and the second camera 121' can photograph the same object in a spaced distance, they can provide the left and right eye images for implementing the 3D image introduced in the description with reference to FIG. 2 and FIG. 3.

The reason why the first camera 121 is rotatably provided is described as follows. First of all, in case of photographing a user's face in case of a video call or the like for example, the first camera 121 is rotated in front direction to photograph an image of the user. In particular, the user makes a call by listening to audio information provided via the speaker and the like while observing an image of a counterpart via the display unit 151 in the course of the video call. Therefore, the camera provided for the video call enables photographing in a direction matching a display direction of the main display unit.

Moreover, it is able to photograph an image of a general subject by rotating the first camera 121. Of course, since the second camera 121' is provided to the backside of the terminal body, a user is able to simultaneously observe and photograph a subject via the display unit 151.

In this case, since the first camera 121 and the second camera 121' can photograph the same subject located in the same direction, they can photograph left and right eye images for the 3D image implementation.

A flash 123 and a mirror 124 can be additionally provided adjacent to the second camera 121'.

The flash 123 throws a light on a subject when the subject is photographed via the second camera 121'. When a user attempts to photograph himself/herself using the second camera 121' [self-photographing], the mirror 124 reflects the user's face thereon.

An audio output unit (not shown in the drawing) can be additionally provided to the backside of the terminal boy. In this case, the audio output unit is able to implement the stereo functionality together with the audio output unit shown in FIG. 5(a) and is also usable for the implementation of a speakerphone mode in making a call.

A receiving antenna 116 can be additionally provided to a lateral side of the terminal body as well as an antenna for a call or the like. The antenna 116 configuring a part of a broadcast receiving module 111 (cf. FIG. 1) is retractably provided to the main body unit 230.

A power supply unit 190 for supplying a power to the mobile terminal 100 can be provided to a backside of the terminal body. In particular, the power supply unit 190 is built as a battery in the terminal body. Alternatively, the power supply unit 190 can be detachably provided to the terminal body in a manner of being attached/detached externally in direct.

Optionally, a touchpad 135 for detecting a touch can be provided to the rear case 102.

Referring to FIG. 5(c), in case that the first camera 121 is rotated in the direction of the rear case 102, the first camera 121 and the second camera 121' can have the same photographing direction to enable the photographing of left and right eye images.

FIG. 6 is a diagram for one example of configuration of a mobile terminal according to one embodiment of the present invention. In particular, FIG. 6(a) is a front perspective diagram of a mobile terminal according to the present invention, FIG. 6(b) is a front perspective diagram for another operational status of the mobile terminal according to the present invention, and FIG. 6(c) is a rear perspective diagram of the mobile terminal according to the present invention. And, the description redundant with the former descriptions with reference to FIG. 1 and FIG. 5 shall be omitted. The redundant description of the same reference numbers will be omitted and the following description is mainly focused on the difference from that of the former embodiment shown in FIG. 5.

According to the embodiment shown in FIG. 6, the first camera is rotatably provided, is selectively retracted or pulled out of the case, and can be rotatably provided. And, the rotatably provided camera can be pulled out of the lateral side of the case.

In particular, the mobile terminal shown in FIG. 6 includes a first camera 121 retractable in a mobile terminal body. If the first camera 121 is embedded in the case, it is not observed. If the first camera 121 is popped up or pulled out, it is able to take a photograph of a subject. The first camera 121 can be retractably provided to a top lateral side of the mobile terminal body, as shown in FIG. 6, among lateral sides formed by the first and second cases 101 and 102.

The first camera 121 can be configured rotatable if pulled out. Therefore, in the status shown in FIG. 6(b), a user is able to photograph himself or make a video call while watching the display unit 151.

Yet, if the first camera 121 is rotated, as shown in FIG. 6(c), the first camera 121 is able to take a picture of the same subject together with the second camera 121'. Likewise, left and right eye images for the 3D image implementation can be taken.

Of course, since the second camera 121' is able to photograph a general subject, a user is able to take the same picture as a general portable digital camera by observing a subject and a display unit 151. Namely, the first camera 121 may not be pulled out unless a 3D photographing, a video call or the like.

Figure 7:
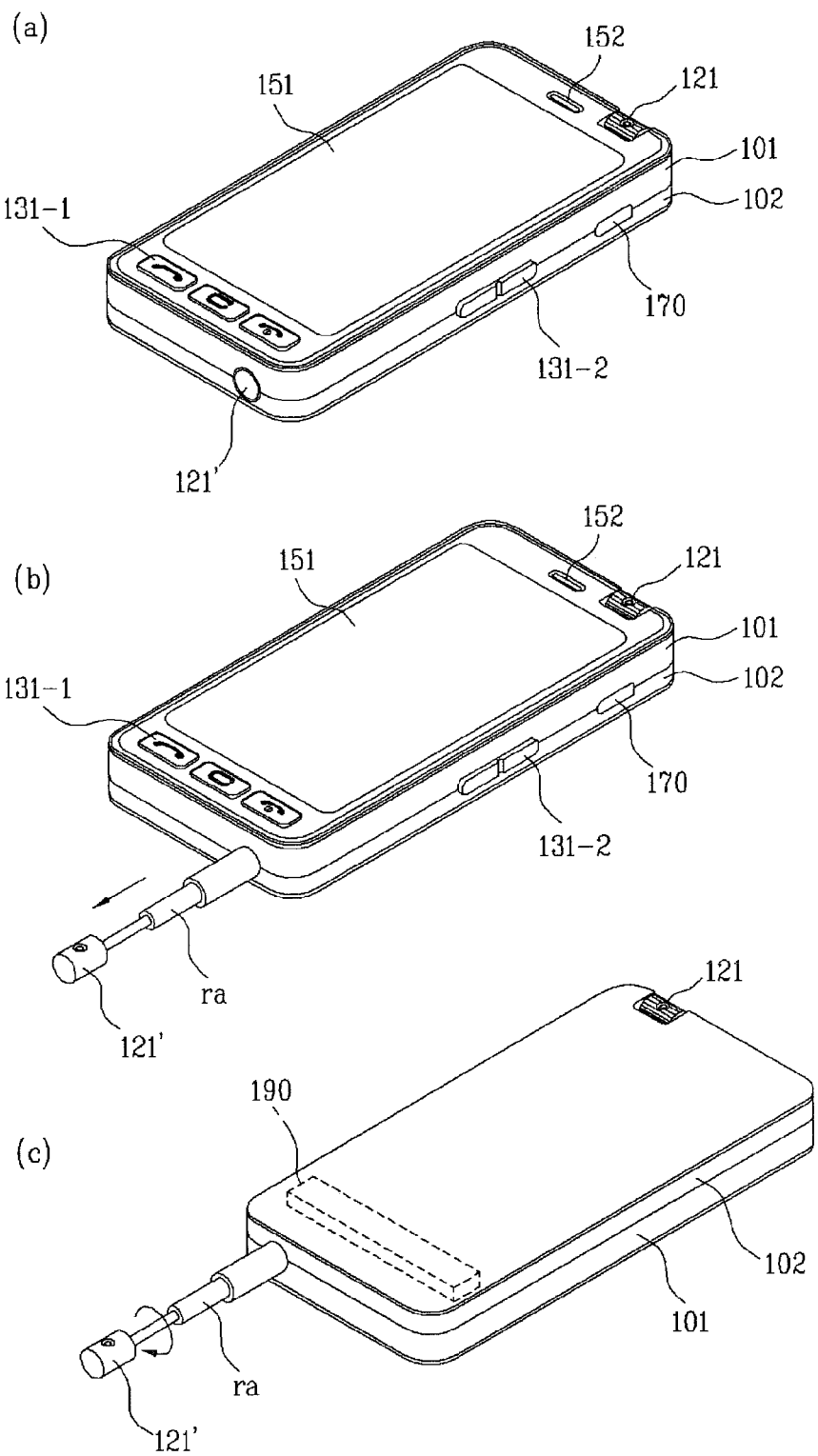
FIG. 7 is a diagram for one example of configuration of a mobile terminal according to one embodiment of the present invention.

FIG. 7 is a diagram for one example of configuration of a mobile terminal according to one embodiment of the present invention. In particular, FIG. 7(a) is a front perspective diagram of a mobile terminal according to another embodiment of the present invention, FIG. 7(b) is a front perspective diagram for another operational status of the mobile terminal according to the present invention, and FIG. 7(c) is a rear perspective diagram of the mobile terminal according to the present invention. And, the description redundant with the former descriptions with reference to FIG. 1 and FIG. 5 shall be omitted. The redundant description of the configurations indicated by the same reference numbers will be omitted and the following description is mainly focused on the difference from that of the former embodiment.

Like the former embodiment, the embodiment shown in FIG. 7 includes a pair of cameras.

A first camera 121 is rotatably provided to one length-direction end portion of a mobile terminal body and a second camera 121' can be retractably provided to a bottom lateral side among lateral sides of the mobile terminal body including a first case 101 and a second case 102.

The first camera 121 can be rotatably provided to one end portion of an overlapped pipe member that is extensible and contractile. And, the first camera 121 can be rotatably provided centering on a rotational shaft (not shown in the drawing) in parallel with a retractable direction.

Unlike the former embodiment shown in FIG. 6 for the simple retraction or pulling-out, the second camera 121' can adjust its pull-out length using a retractable overlapping pipe member ra. And, the second camera 121' can be rotatably loaded using the retractable overlapping pipe member as a rotational shaft while pulled out.

According to the embodiment shown in FIG. 7, since each of the first camera 121 and the second camera 121' is rotatable to photograph a subject located in front or rear of the mobile terminal, they enable the 3D photographing in both directions of the mobile terminal, i.e., front and rear directions of the mobile terminal.

In particular, when a user performs a 3D photographing on a subject located externally, a left eye image and a right eye image can be taken after rotating the first and second cameras 121 and 121' in a backside direction of the mobile terminal [FIG. 7(*c*)]. In case that a user attempts to take a 3D image of himself, the user is able to perform the photographing in a manner of observing the display unit 151 by rotating each of the cameras in the front direction of the mobile terminal [FIG. 7(*c*)].

And, the user is able to make a video call by rotating either the first camera 121 or the second camera 121' in the front direction of the mobile terminal.

According to the embodiment shown in FIG. 7, since the first camera 121 is rotatable in the front or rear direction of the mobile terminal and a retractable length of the overlapping pipe member ra is adjustable as well, it is able to adjust a spaced distance between the first camera 121 and the second camera 121'.

As mentioned in the foregoing description with reference to FIG. 3, in performing a photographing for 3D image implementation, a condition for enhancing a stereoscopic effect is to decrease a distance d from an object O or to increase a distance s between both eyes, if the distance between both eyes is fixed. Therefore, in order to increase the stereoscopic effect, the spaced distance between the first camera 121 and the second camera 121' is adjustable in consideration of a distance from a subject.

For instance, in case of photographing a shape of a user himself, as the distance d from the object o is short, it is able to perform the photographing by pulling out the first antenna 121*a* little bit. In case of photographing another subject outside, it is able to obtain an effect similar to the method of decreasing the distance d from the object o by pulling out the first antenna 121 as long as possible.

Figure 8:
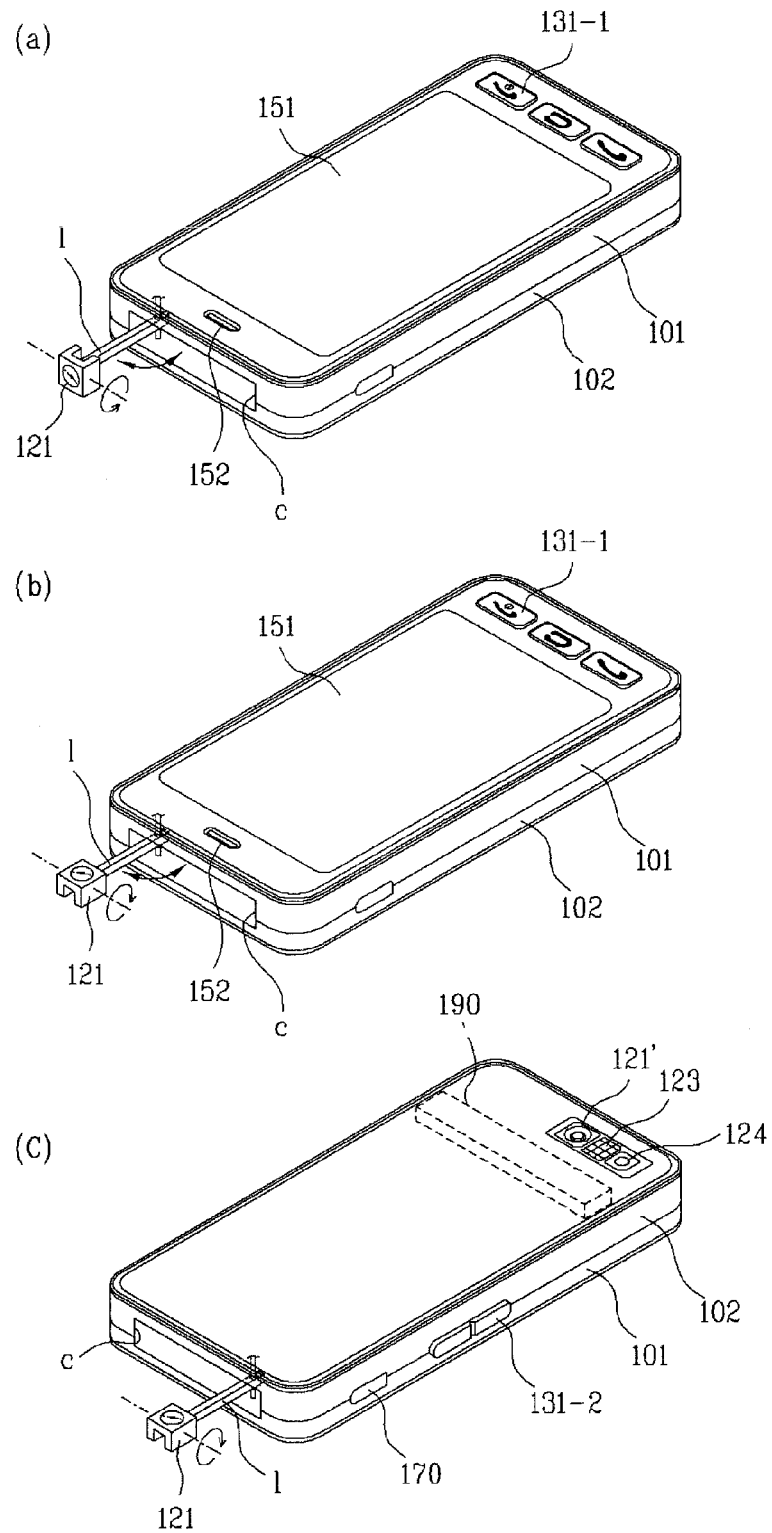
FIG. 8 is a diagram for one example of configuration of a mobile terminal according to one embodiment of the present invention.

FIG. 8 is a diagram for one example of configuration of a mobile terminal according to one embodiment of the present invention. In particular, FIG. 8(*a*) is a front perspective diagram of a mobile terminal according to another embodiment of the present invention, FIG. 8(*b*) is a front perspective diagram for another operational status of the mobile terminal according to the present invention, and FIG. 8(*c*) is a rear perspective diagram of the mobile terminal according to the present invention. And, the description redundant with the former descriptions with reference to FIG. 1 and FIG. 5 shall be omitted. The redundant description of the configurations indicated by the same reference numbers will be omitted and the following description is mainly focused on the difference from that of the former embodiment.

Like the former embodiment, the embodiment shown in FIG. 8 includes a pair of cameras.

The embodiment shown in FIG. 8 has the following in common with the former embodiments shown in FIG. 6 and FIG. 7. First of all, the first camera is provided rotatable in at least one direction in a manner of being selectively exposed to an outside.

According to the embodiment shown in FIG. 8, the first camera 121 is selectively received in or projected from an accommodating space c provided to a lateral side of the mobile terminal body.

The first camera 121 is loaded using a link member 1 provided rotatable in the accommodating space c as a medium. This link member has a link shaft loaded in a thickness direction of the mobile terminal. And, the first camera 121 can be provided with a rotational shaft in a vertical direction of the link shaft.

The first camera 121 can be rotated in a front or rear direction of the mobile terminal by the rotational shaft.

Therefore, in case of making a video call, the first camera 121 can be rotated in the front direction of the mobile terminal. In case of photographing left and right eye images for the 3D image photographing, referring to FIG. 8(*c*), the first camera 121 can photograph the left eye image and the right eye image by being rotated in the rear direction of the mobile terminal together with the second camera 121' fixed to the second case 102 of the mobile terminal.

FIG. 9 is a diagram for one example of configuration of a mobile terminal according to one embodiment of the present invention. In particular, FIG. 9(*a*) is a front perspective diagram of a mobile terminal according to another embodiment of the present invention, in which a closed configuration of the mobile terminal is shown. FIG. 9(*b*) is a front perspective diagram of a mobile terminal according to another embodiment of the present invention, in which an open configuration of the mobile terminal is shown.

The present invention provides a mobile terminal including a first body having a display unit configured to display a 3D image, a second body slidably assembled with the first body, the second body having at least one user input unit, a first camera provided to the first body, a second camera provided to the second body, and a control unit converting image information photographed via the first and second cameras to the 3D image.

And, the present invention provides a mobile terminal including a display unit configured to display a 3D image, at least one user input unit, at least two cameras, and a control unit converting image information photographed via at least two of the at least two cameras to the 3D image. And, at least one of the at least two cameras is can be displaced to adjust a distance between the at least two cameras.

Unlike the above mentioned embodiment, a pair of bodies 200A and 100B are slidably assembled together. If the first body 100A is placed to be overlapped with the second body 100B, it can be named a closed configuration. And, the first body 100A, as shown in FIG. 9(*b*), is placed to expose at least one portion of the second body 100B, which can be named an open configuration.

The mobile terminal shown in FIG. 9 is normally operative in the closed configuration to work in a standby mode that can be released by a user's manipulation. The mobile terminal is normally operative in the open configuration to work in a call mode or the like. Yet, the mobile terminal enters a standby mode according to a user's manipulation or after prescribed duration.

The first body 100A can be provided with a display unit, an audio output module 152, a first camera module 121 and a first user input unit 131-1. The display unit 151 is configured in a manner that a touchpad is overlapped as a layer structure. If a touchpad is overlapped with the display unit 151 to configure a layer structure, the display unit 151 works as a touchscreen. So, a user touches the display unit 151 to enable an information input.

A second user input unit 131-2 can be provided to the second body 100B.

And, a third user input unit 131-3, a microphone module 122, and an interface unit 170 can be provided to a lateral side of the second body 100B. In aspect of functionality, the first user input unit 131-1 is provided to input such a command as a start, an end, a scroll, and the like and the second user input unit 131-2 is provided to input numerical figures, characters, symbols, and the like. And, the third user input unit 131-3 can operate as a hotkey to activate a special function within the mobile terminal.

The microphone module 122 can be implemented into a configuration suitable for receiving user's voice or other sounds. The interface unit 170 is a path for enabling the mobile terminal of the present invention to exchange data with an external device. For instance, the interface unit 170 can include at least one of a connecting port for wire/wireless connection to an earphone, a port for short-range communication (e.g., IrDA port, Bluetooth port, a wireless LAN port, etc.), and a power supply port for supplying a power to the mobile terminal. As the interface unit 170 has been described in the foregoing description, its details shall be omitted in the following description. A power supply unit 190 is loaded in the backside of the second body 100B to supply a power to the mobile terminal. The power supply unit 190 includes a separate cover and can be loaded within the second body 100B. And, the power supply unit 190, for example, includes a chargeable battery and can be detachably attached for battery charging.

A second camera 121' can be provided to the second body 100B in the vicinity of the second user input unit 131-2.

When the first body 100A is loaded over the second body 100B, if the first and second bodies 100A and 100B slide to be unfolded, the second camera 121' can be externally exposed.

In this case, the second camera 121' photographs the same subject together with the first camera 121 to take a left eye image and a right eye image.

Since the first body 100A and the second body 100B are slidably assembled together, it is able to control a stereoscopic effect by the distance between the cameras according to a slide distance like the former embodiment shown in FIG. 6.

The first camera 121 or the second camera 121' is usable in taking a user's image in the course of a video call, which is in common with some of the aforesaid embodiments.

FIG. 10 is a diagram for one example of configuration of a mobile terminal according to one embodiment of the present invention. In particular, FIG. 10(*a*) is a front perspective diagram of a mobile terminal according to another embodiment of the present invention, in which a closed configuration of the mobile terminal is shown. FIG. 10(*b*) is a rear diagram of a mobile terminal according to another embodiment of the present invention, in which an open configuration of the mobile terminal is shown.

Referring to FIG. 10, the second camera 121' is provided to a backside of the second body 100B. The first camera 121 can be rotatably provided to the first body 100A. And, the first camera 121 can be rotatably provided to one end portion located at the topside of the display unit 151 of the first body 100A.

In the mobile terminal shown in FIG. 10, the first camera 121 for a video call and the like is rotatably provided to the topside of the first body 100A. In order to photograph a subject located in rear of the mobile terminal or to photograph left and right eye images for the 3D image implementation together with the first camera 121, the second camera 121' is provided to a lower part of the backside of the second body 100B.

After the first camera 121 has been rotated backward, as shown in FIG. 10(*b*), the first body 100A and the second body 100B are slidably assembled together. Therefore, like the former embodiment shown in FIG. 6, the embodiment shown in FIG. 10 is able to adjust a stereoscopic effect by adjusting a distance between the cameras according to a sliding distance.

FIG. 11 is a diagram for one example of configuration of a mobile terminal according to one embodiment of the present invention. In particular, FIG. 11(*a*) is a front perspective diagram of a mobile terminal according to another embodiment of the present invention, in which a closed configuration of the mobile terminal is shown. FIG. 11(*b*) is a rear diagram of a mobile terminal according to another embodiment of the present invention, in which a closed configuration of the mobile terminal is shown. And, FIG. 11(*c*) is a rear diagram of a mobile terminal according to another embodiment of the present invention, in which an open configuration of the mobile terminal is shown.

Referring to FIG. 11, the first body 100A is provided with a projected part P projected backward from an upper part of its end portion. And, the first camera 121 can be rotatably loaded in the projected part P.

The present embodiment shown in FIG. 11 differs from the former embodiment shown in FIG. 10 in that the first camera 121 rotatably provided to the upper end of the first body 100A is externally exposed despite that the first and second bodies 100A and 100B are in the closed configuration.

In order to enable the first camera 121 to be externally exposed despite that the first and second bodies 100A and 100B are in the closed configuration, the first body 100A is configured longer than the second body 100B. And, the projected part P is formed to enable the portion, in which the first camera 121 is loaded, to be projected backward. If so, even if the first and second bodies 100A and 100B are in the closed configuration, the projected part P becomes externally projected and the first camera 121 can be externally exposed irrespective of the configuration of the first and second bodies 100A and 100B as well.

Therefore, according to the embodiment shown in FIG. 11, referring to FIG. 11(*b*), it is able to photograph a subject located in the same direction despite that the first and second bodies 100A and 100B are in the closed configuration.

Of course, in order to increase a stereoscopic effect of a 3D image, it is able to photograph a left eye image and a right eye image by enabling the first and second bodies 100A and 100B to enter an open configuration.

Like the former embodiment shown in FIG. 10, the present embodiment is able to take an image of a user in the course of a video call in a manner of rotating the first camera 121 provided to the upper end of the first body 100A toward the display unit 151.

FIG. 11(*b*) shows a first camera 121 and a second camera 121'. When the mobile terminal 100 is provided in a closed configuration (or closed state) as in FIG. 11(*b*), the first camera 121 and the second camera 121' may be separated from each other by a distance (d) of 1.5 inches, for example. When the mobile terminal 100 is provided in an open configuration (or opened state) as in FIG. 11(*c*), the first camera 121 and the second camera 121' may be separated from each other by a distance (d) of 2.5 inches, for example. The mobile terminal 100 may also include a mechanism or device such that the second body 100B may stop at a plurality of different positions as the second body 1008 moves (relative to the first body 100A) from a closed position (in the closed configuration) to an open position (in the open configuration) such that variations of distances (d) between 1.5 inches and 2.5 inches can be achieved.

The first camera 121 and the second camera 121' are separated by a distance d. The distance d may vary based on movement of the second body 100B relative to the first body 100A. The distance d may be determined based on the display that will display a three-dimensional (3D) image. For example, a mobile terminal may have a display size of 2 inches to 7 inches, whereas a television (TV) screen may have a display size of 70 inches or less. If a user desires to display a 3D image on either the mobile terminal display or the TV display, then the distance d should be less than 1.5 inches. This may avoid a divergent parallax problem. On the other hand, if a user desires to display a 3D image on only the mobile terminal display, then the distance d should be greater than 1.5 inches and less than 2.5 inches (1.5"<d<2.5").

When the first and second cameras 121 and 121' are utilized to photograph an image or a moving picture, the distance d that is set may be stored on the mobile terminal for subsequent use by the controller 180. That is, the controller 180 may detect the distance d between the first camera 121 and the second camera 121'. Information of the detected distance may be stored along with the photographed object. The information may be stored to be used when the 3D image information is transferred to be displayed on another display device.

FIG. 12 is a diagram for one example of configuration of a mobile terminal according to one embodiment of the present invention. In particular, FIG. 12(*a*) is a front perspective diagram of a mobile terminal according to another embodiment of the present invention, in which a closed configuration of the mobile terminal is shown. FIG. 12(*b*) is a front perspective diagram of the mobile terminal according to another embodiment of the present invention, in which an open configuration of the mobile terminal is shown. And, FIG. 12(*c*) is a rear diagram of the mobile terminal according to another embodiment of the present invention, in which an open configuration of the mobile terminal is shown.

The present invention includes a first body having a display unit configured to display a 3D image, a second body rotatably assembled with the first body, the second body having at least one user input unit, a first camera provided to the first body, a second camera rotatably provided to a position spaced apart from the first camera, and a control unit converting image information photographed via the first and second cameras to the 3D image. This configuration is described in detail as follows.

First of all, unlike the former embodiments shown in FIGS. 9 to 11, the mobile terminal shown in FIG. 12 is configured in a manner that one of the first and second bodies 100A and 100B is folded/unfolded against the other. In this case, a folded configuration can be called a closed configuration, while an unfolded configuration can be called an open configuration.

The first camera 121 for photographing an image of a user in the course of a video call is rotatably loaded in a hinge part h for connecting the first and second bodies 100A and 100B together, by which the first and second bodies 100A and 100B can be folded.

The second camera 121' is used to photograph an external subject. And, the second camera 121' is also used to photograph a left or right eye image for a 3D photographing with the first camera. The second camera 121' can be fixed to a backside of a surface, on which the first display unit 151 is loaded, of the first body 100A, i.e., to a surface to which a second display unit 151' is provided (if the second display unit is provided).

Therefore, referring to FIG. 12(*c*), it is able to photograph the same subject in a spaced distance. Of course, in a folded configuration (FIG. 12(*a*)), it is able to photograph a 3D image occasionally.

Figure 13:
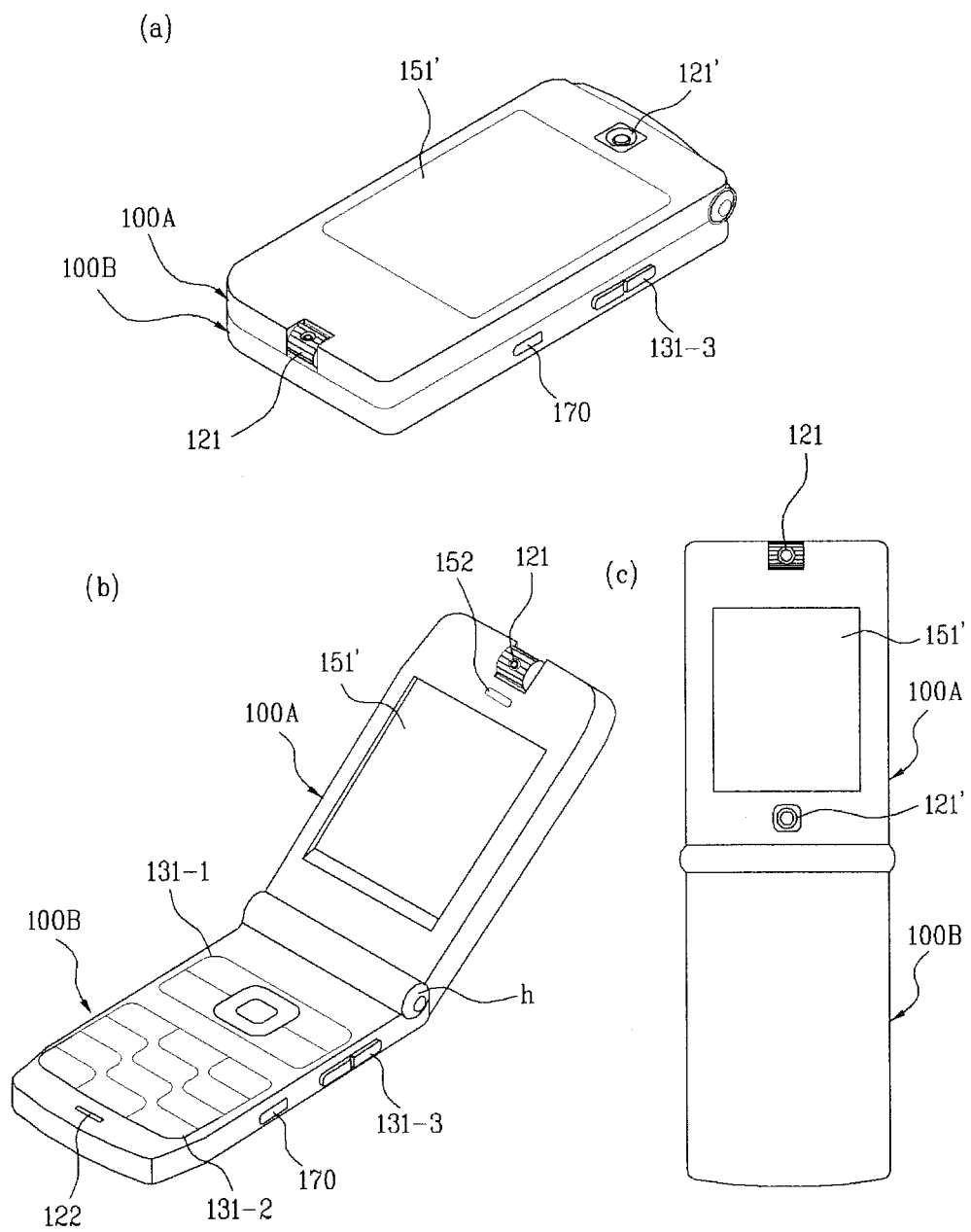
FIG. 13 is a diagram for one example of configuration of a mobile terminal according to one embodiment of the present invention.

FIG. 13 is a diagram for one example of configuration of a mobile terminal according to one embodiment of the present invention. In particular, FIG. 13(*a*) is a front perspective diagram of a mobile terminal according to another embodiment of the present invention, in which a closed configuration of the mobile terminal is shown. FIG. 13(*b*) is a front perspective diagram of the mobile terminal according to another embodiment of the present invention, in which an open configuration of the mobile terminal is shown. And, FIG. 13(*c*) is a rear diagram of the mobile terminal according to another embodiment of the present invention, in which an open configuration of the mobile terminal is shown.

Referring to FIG. 13, a first camera 121 for photographing an image of a user in the course of a video call can be rotatably provided to one end portion of a first body 100A, and more particularly, to an end portion opposite to a hinge part h. A second camera 121' is used to photograph an external subject. And, the second camera 121' is also used to photograph a left or right eye image for a 3D photographing with the first camera 121. The second camera 121' can be fixed to a backside of a first display unit of the first body 100A, i.e., to a surface to which a second display unit 151' is provided.

The first camera 121 can be provided to a position enabling the display unit 151/151' to be placed between the first camera 121 and the second camera 121'.

Therefore, referring to FIG. 13(*c*), it is able to photograph the same subject in a spaced distance.

Mobile Terminal with Photographing Unit

In the following description, a configuration of the mobile terminal having the photographing unit 200 described with reference to FIG. 1 is explained.

As mentioned in the foregoing description, since such a display device for displaying a 3D image as a TV and the like provides a stereoscopic effect by the principle of selectively observing a left eye image and a right eye image with a left eye and a right eye, even if the display device designed to view a horizontal image in a horizontal direction is rotated in a vertical direction, it is unable to view a vertical image as a 3D image with a stereoscopic effect. The reason is explained as follows. First of all, as left and right eyes of a human body are located in a horizontal direction, a left eye image and a right eye image should be provided to the left eye and the right eye, which are spaced apart from each other in the horizontal direction, respectively. Although a display device having a width greater than a length according to the related art, which forms a 3D image by dividing an image in a vertical direction, is rotated in the vertical direction, the left and right eyes spaced apart from each other in the horizontal direction are not able to observe the left and right eye images. Therefore, a user may not sense the stereoscopic effect.

In order to solve this technical problem, assume the features disclosed in Korean Patent Registered No. 10-0647517 (Cell structure parallax barrier and stereoscopic image display apparatus using the same) and the features disclosed in Korean Patent Registered No. 10-0935892 (Junction apparatus for horizontal/vertical alignment of display panel for stereoscopic image), the subject matters of which are incorporated herein by reference.

According to the disclosed features, a parallax barrier and a stereoscopic image displaying apparatus including the same according to the present embodiment fabricate a barrier for reproducing a stereoscopic image by a cell unit using a liquid crystal display panel. Hence, the barrier can be switched to a horizontal/vertical direction according to properties of the stereoscopic image. And, the barrier enables the switching to 2D/3D as well. In particular, a 3D image can be viewed by rotating the same display unit 151 in a horizontal direction or a vertical direction. Optionally, a general 2D image or a stereoscopic 3D image can be viewed on the same display unit 151. The parallax barrier and stereoscopic image displaying apparatus including the same according to the registered invention include a cell gap between pixels arrayed as a cell structure of a liquid crystal display part and are able to enhance brightness of an image by adjusting etching directions of bottom and top plates and a polarizing direction of a polarizing film part. Therefore, it is able to enhance overall brightness of a 3D image.

Moreover, the parallax barrier and stereoscopic image displaying apparatus including the same according to the registered invention enable a stereoscopic image to be viewed in a manner of rotating R, G and B arranged on pixel in a horizontal direction, thereby enhancing a viewing angle and a viewing distance. The parallax barrier and stereoscopic image displaying apparatus including the same according to the registered invention enhances working performance by lowering fabrication difficulty, thereby reducing a manufacturing cost.

Therefore, the mobile terminal 100 having the photographing unit according to the present embodiment can have the cell structure parallax barrier and the display unit 151 using the same disclosed in the registered invention.

Specifically, on the assumption of carrying the mobile terminal 100, the mobile terminal 100 according to the present embodiment may be frequently used to photograph and view an image in a vertical direction as well as a horizontal direction. In a manner of adopting the ell structure parallax barrier and the display unit 151 using the same disclosed in the registered invention for the mobile terminal 100 according to the present invention, a horizontal image can be viewed by being 3-dimensionally displayed in the horizontal direction on the display unit 151 or a vertical image can be viewed by being 3-dimensionally displayed in the vertical direction on the display unit 151.

In particular, since a direction of a parallax barrier provided on liquid crystals for displaying a left eye image and a right eye image alternately can be switched to a horizontal or vertical direction, even if the same display unit is arranged in the horizontal or vertical direction, a 3D display of a horizontal/vertical image can be implemented in a manner of changing a direction of the parallax barrier and a display direction of a divided image.

Details of the invention disclosed in Korean Patent Registered No. 10-0647517 (Cell structure parallax barrier and stereoscopic image display apparatus using the same) and the invention disclosed in Korean Patent Registered No. 10-0935892 (Junction apparatus for horizontal/vertical alignment of display panel for stereoscopic image) are omitted from the following description of the present embodiment and can be replaced by citation of the above disclosures.

In the following description, a mobile terminal 100 according to the present embodiment is explained with reference to FIG. 14. A display unit of a mobile terminal explained in the following description is assumed as having the parallax barrier provided to one of various display modules.

Figure 14:
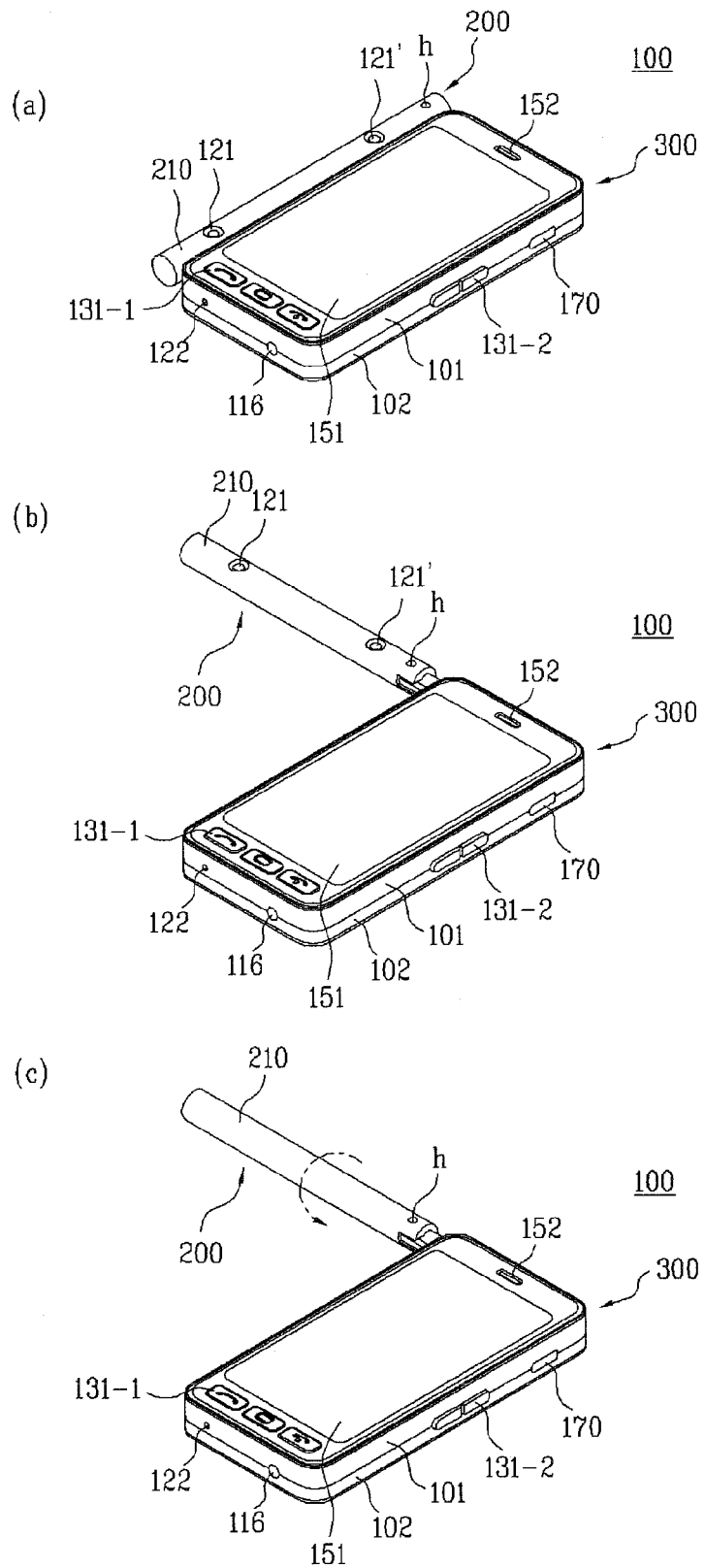
FIG. 14 is a diagram a mobile terminal according to another embodiment of the present invention.

FIG. 14 is a diagram a mobile terminal 100 according to another embodiment of the present invention. In particular, FIG. 14(a) is a front perspective diagram of a mobile terminal 100 according to the present embodiment, in which a photographing unit 200 is folded next to the mobile terminal 100. FIG. 14(b) is a front perspective diagram of a mobile terminal 100 according to the present embodiment, in which a photographing unit 200 is unfolded from a main body of the mobile terminal 100. And, FIG. 14(c) is a front perspective diagram of a mobile terminal 100 according to the present embodiment, in which a photographing unit 200 is rotated after having been unfolded from a main body 300 of the mobile terminal 100.

Referring to FIG. 14, the mobile terminal 100 includes a main body 300 of a bar type, by which the present embodiment is non-limited. And, the present embodiment is applicable to such a structure, which enabling at least two bodies to be connected to each other in a manner of moving relatively, as a slide type, a folder type, a swing type, a swivel type and the like. And, the slide type and the folder type shall be described in the later description.

The mobile terminal according to the present embodiment mainly includes a main body 30 and a photographing unit 200.

The body 300 of the mobile terminal 100 includes a housing forming an exterior. According to the present embodiment, the housing configuring the body 300 of the mobile terminal 100 can be divided into a front housing 101 and a rear housing 102. Various electric and electronic components are loaded in a space provided between the front housing 101 and the rear housing 102. Optionally, at least one middle housing can be additionally provided between the front housing 101 and the rear housing 102.

The housing is formed by injection molding of synthetic resin or can be formed of such a metal substance as stainless steel (STS), titanium (Ti) and the like.

A display unit 151, an audio output module 152, a user input unit 130 (131-1, 131-2), a microphone 122 and the like can be provided to the body 300 of the mobile terminal 100.

The display unit 151 mostly occupies a main surface of the front housing 101. The audio output unit 152 can be provided to a region adjacent to one of both end portions of the display unit 151. A first camera 121 is rotatably provided to the one end portion. And, the first user input unit 131-1, the microphone 122 and the like can be provided to a region adjacent to the other end portion. Moreover, the second user input unit 131-2, the interface 170 and the like can be provided to lateral sides of the front housing 101 and the rear housing 102.

The user input unit 130 is manipulated to receive an input of a command for controlling an operation of the mobile terminal 100. And, the user input unit 130 is able to include a plurality of manipulating units. Moreover, the user input unit 130 can include a first user input unit 131-1 and a second input unit 131-2 according to functionality.

The user input units 131-1 and 131-2 can be generally named a manipulating portion. And, the manipulating portion can adopt any mechanism having a tactile manner that enables a user to perform manipulation with tactile feeling.

Contents inputted through the first or second user input unit 131-1 or 131-2 can be set in various ways. The first user input unit 131-1 receives an input of such a command as start, end, scroll and the like, while the second user input unit 131-2 receives an input of such a command as a volume adjustment of sound outputted from the audio output unit 152, a switching to a touch recognizing mode of the display unit 151, and the like.

A receiving antenna 116 can be additionally provided to a lateral side of the terminal body as well as an antenna for a call or the like. The antenna 116 configuring a part of a broadcast receiving module 111 (cf. FIG. 1) is retractably provided to the terminal body.

A power supply unit (not shown in the drawing) for supplying a power to the mobile terminal 100 can be provided. In particular, the power supply unit is built as a battery in the terminal body. Alternatively, the power supply unit can be detachably provided to the terminal body in a manner of being attached/detached externally in direct.

Optionally, a touchpad (not shown in the drawing) for detecting a touch can be provided to the rear housing 102.

The present embodiment provides a mobile terminal 100 including a body 300 having a display unit 151 for displaying a 3D image, a photographing unit 200 having a first camera 121 for photographing a left eye image and a second camera 121' for photographing a right eye image, the photographing unit 200 connected to the body in a manner of having an adjustable connection angle, and a control unit controlling an image photographed by the photographing unit 200 to be converted to the 3D image, the control unit controlling the display unit 151 to display the 3D image. In this case, the control unit changes a display direction of the 3D image on the display unit 151 to correspond to a type of the 3D image.

The mobile terminal 100 according to the present embodiment includes the photographing unit 200 having first and second cameras 121 and 121' for photographing left and right eye images to photograph the 3D image.

The first and second cameras 121 and 121' of the photographing unit 200 are provided in a manner of being spaced apart from each other in a predetermined distance. The reason why the photographing unit 200 includes the first and second cameras 121 and 121' is because the first camera 121 and the second camera 121' photograph the left eye image and the right eye image for the 3D image, respectively.

The first and second cameras 121 and 121' can be loaded in a photographing unit housing 210 in a manner of being spaced apart from each other. According to the present embodiment, the photographing unit 200 is connected to the body 300 having the display unit 151 for displaying the 3D image in a manner of having an adjustable connection angle.

In particular, the first and second cameras 121 and 121' of the photographing unit 200 are located in a manner of being spaced from each other in a length direction of the photographing unit housing 210. And, the hinge h enables one end portion of the photographing unit housing 210 in the length direction and the body housing to be rotatably connected to each other.

In particular, the hinge h for enabling the body and the photographing unit to be rotatably connected to each other can be provided to one end of the lateral side of the body 300.

The reason why the photographing unit 200 is connected in a manner of having an adjustable connection angle is because a horizontal image for viewing a 3D image in a horizontal direction and a vertical image for viewing a 3D image in a vertical direction are photographed by being discriminated from each other.

Like a hinge for connecting a general radio antenna and the like to a body, in case of adopting the hinge h capable of rotation and incline adjustment, the hinge h for rotatably connecting the photographing unit 200 and the body 300 of the mobile terminal 100 is able to displace the photographing unit 200 in a horizontal direction or a vertical direction, as shown in FIGS. 15(*a*) to 15(*d*), and is also able to change a photographing direction of a camera provided to the photographing unit 200 to a display direction of the display unit 151 or a direction opposite to the display direction of the display unit 151.

The photographing unit 200 can be provided detachably. In this case, the detachably provided photographing unit 200 can include the hinge h. Namely, a part including the hinge h can be included in the photographing unit 200.

The photographing unit 200 includes the hinge h and can be detachably inserted in one of lateral sides of the body.

The photographing unit 200 can be electrically and physically connected to the mobile terminal 100 via the interface unit 170.

The body 300 can be rotatably connected to the photographing unit 200 by the hinge h within a predetermined range. In this case, the predetermined range can include 90 degrees. This is to photograph a horizontal image and a vertical image.

In general, an image photographed by a camera of the mobile terminal 100 is displayed via the mobile terminal 100 as soon as photographed. In case that the connected angle between the photographing unit 200 and the mobile terminal 100 is changed, when a 3D image is photographed, a horizontal 3D image is checked via the display unit 151 in the state shown in FIG. 14(*a*) and can be simultaneously photographed as well. In the state shown in FIG. 14(*b*), a vertical 3D image is checked via the display unit 151 and can be simultaneously photographed as well.

In the mobile terminal 100 shown in FIG. 14(*a*) or FIG. 14(*b*), the photographing direction of the photographing unit 200 is equal to the display direction of the display unit 151. Hence, in case that a photographer takes his image, it can correspond to a self-photographing mode. Of course, the self-photographing mode can include a video call mode. In particular, the self-photographing mode can include a 3D video call mode.

Yet, in the state shown in FIG. 14(*c*), the photographing unit 200 is rotated from the state shown in FIG. 14(*b*). In this case, the photographing direction of the photographing unit 200 is rotated in a direction opposite to the display direction of the display unit 151. Namely, this corresponds to a case that a photographing target is located in front of the photographer instead of the self-photographing.

FIG. 14(*b*) shows the photographing unit 200 that includes the first camera 121 and the second camera 121'. The first camera 121 and the second camera 121' are separated by a distance d. The distance d may vary based on movement of one of the cameras 121, 121' relative to the other one of the cameras 121, 121'.

Of course, in the state shown in FIG. 14(*c*), if the photographing unit 200 is folded toward the body 300, the photographer is able to photograph the photographing target located in front and is also able to view the photographed image 3-dimensionally via the display unit 151. The description relating to the photographing mode of the embodiment shown in FIG. 14 is explained with reference to FIG. 15.

FIG. 15 is a diagram for explaining a use mode of a mobile terminal according to another embodiment of the present invention. And, the description redundant with the former description with reference to FIG. 14 is omitted from the following description.

In particular, FIG. 15(*a*) shows a case that a horizontal image is photographed by 3D self-photographing. FIG. 15(*b*) shows a case that a vertical image is photographed by 3D self-photographing. FIG. 15(*c*) shows a case that a horizontal image is photographed by 3D photographing. And, FIG. 15(*d*) shows a case that a vertical image is photographed by 3D photographing.

FIG. 15(*a*) or FIG. 15(*b*) shows a self-photographing mode for photographing a photographer or the like located at a display direction side of an image on the display unit 151 using the mobile terminal 100. FIG. 15(c) or FIG. 15(d) shows a normal photographing mode for photographing a photographer or the like located in a direction opposite to a display direction side of an image on the display unit 151 using the mobile terminal 100.

As mentioned in the foregoing description, the mobile terminal 100 shown in FIG. 15 includes a photographing unit 200 of which connected angle is adjustable against the body. The photographing unit 200 includes first and second cameras 121 and 121' for photographing left and right eye images for a 3D image. Generally, when a user takes a 3D image using the mobile terminal 100, the photographing unit 200 can be maintained in the direction corresponding to left and right eyes of a human body to enable the first and second cameras 121 and 121' to be arranged in the same direction of the aligned direction of the left and right eyes of the human body, e.g., in a horizontal direction.

In particular, since a 3D image provides a stereoscopic effect attributed to a vision difference between a left eye and a right eye, the photographing unit 200 should be maintained in the direction corresponding to positions of the left and right eyes irrespective of whether a type of an image is a horizontal direction or a vertical direction.

Hence, according to the embodiment shown in FIG. 15, assume a case that left and right eyes of a photographer maintain horizontal positions. And, assume a case that the photographing unit 200 maintains a horizontal state to correspond to the arrangement of the left and right eyes. In case of 3-dimensionally displaying a vertical image which is long in a vertical direction, assume that the vertical image is displayed using a whole area of the display unit 151. When the display unit 151 having a width different from a height is arranged long in a horizontal direction, although the vertical image is displayed using a partial area of the display unit, assume that a 3D vertical image is displayed on a whole area of the display unit.

The use mode shown in FIG. 15(a) indicates a case that a user takes a vertical image by 3d self-photographing. Referring to FIG. 15(a), in case that a photographer decides to photograph peripheral characters including himself or a surrounding background, the photographer is able to take a vertical picture. And, the display unit 151 is able to display the vertical image 3-dimensionally.

If a photographing target is the photographer only, a vertical photographing may be preferred to a horizontal photographing. In this case, a photographing is performed in a manner of maintaining a horizontal state of the photographing unit 200 and rotating the body 300 having the adjustable connected angle to the photographing unit 200 in a vertical direction.

In case that a photographing target is not a photographer but an external thing, referring to FIG. 15(c) or FIG. 15(b), a photographing can be performed in a manner of rotating a photographing direction of the photographing unit 200 in a direction opposite to the display direction of the display unit 151.

In case that a photographing target is suitable for a vertical image, referring to FIG. 15(c), a photographing or a viewing can be performed when both of the display unit 151 and the photographing unit 200 are arranged in a horizontal direction.

In case that a photographing target is suitable for a horizontal image, referring to FIG. 15(d), a photographing or a viewing can be performed when both of the display unit 151 and the photographing unit 200 are arranged in a vertical direction.

The examples for using the mobile terminal shown in FIG. 15 assume a case that an image photographed by the photographing unit 200 is viewed 3-dimensionally via the display unit 151 of the body as soon as photographed by the photographing unit 200 of the mobile terminal 100.

In general, the mobile terminal 100 is provided with an internal or external memory 160 (FIG. 1) and enables an image photographed by the camera or the like to be stored in the corresponding memory.

Therefore, when a stored image is played through the mobile terminal 100, in case of viewing a horizontal image in a horizontal direction or viewing a vertical image in a vertical direction, a user is preferably allowed to view both of the images as stereoscopic 3D images.

Therefore, in case that a stored image is a horizontal image through a user selection or an image type determining procedure according to a type of the stored image, the display unit 151 displays the stored image in a manner of providing a stereoscopic effect on the assumption that the stored image will be viewed in a horizontal direction of the display unit 151. In case that a stored image is a vertical image through a user selection or an image type determining procedure according to a type of the stored image, the display unit 151 displays the stored image in a manner of providing a stereoscopic effect on the assumption that the stored image will be viewed in a vertical direction of the display unit 151.

Yet, it is difficult for the controller of the mobile terminal 100 to determine whether an image is a horizontal image or a vertical image based on information included in the image photographed via a camera.

If an image stored in the memory of the mobile terminal 100 is the image photographed by the mobile terminal itself, it is able to identify a type of the stored image in a following manner.

First of all, in case of the embodiment shown in FIG. 15(a) or FIG. 15(c) in the photographing mode shown in FIG. 15, since the direction of the display unit 151 is a horizontal direction that coincides with the direction of the photographing unit 200, the corresponding image can be determined as a horizontal image.

Secondly, in case of the embodiment shown in FIG. 15(b) or FIG. 15(d) in the photographing mode shown in FIG. 15, since the direction of the display unit 151 is a vertical direction that does not coincide with a horizontal direction of the photographing unit 200, the corresponding image can be determined as a vertical image.

Therefore, in case of photographing an image using the photographing unit, the controller is able to determine whether the image photographed via the photographing unit is a horizontal image or a vertical image according to a connected angle between the body and the photographing unit.

In particular, as mentioned in the foregoing description, the photographing unit 200 is assumed as maintaining a horizontal state or a direction in parallel with left and right eyes of a photographer.

Thus, it is able to discriminate a vertical image and a horizontal image from each other according to the photographing condition of the photographed image.

Based on the information determined according to the photographing condition and the like, the controller is able to determine a 3D display direction of the display unit according to whether an image displayed on the display unit 151 of the body is a horizontal image or a vertical image.

FIG. 16 is a diagram for explaining play modes for playing back an image stored in a mobile terminal according to another embodiment of the present invention. In particular, FIG. 16(a) shows a viewing mode for viewing a horizontal image 3-dimensionally in a horizontal direction. And, FIG. 16(b) shows a viewing mode for viewing a vertical image 3-dimensionally in a vertical direction. Since it is not necessary to unfold the photographing unit 200 in each viewing mode, a stored image can be viewed while the photographing unit 200 and the body 300 are folded.

Therefore, a horizontal or vertical image can be stereoscopically and 3-dimensionally viewed irrespective of a connected or folded/unfolded angle between the photographing unit 200 and the body 300.

Thus, whether a playback target image is a horizontal image or a vertical image can be determined according to the connected angle between the body 300 and the photographing unit 200 on photographing an image. Once a playback of a 3D image is confirmed, it is able to provide a user with a menu for enabling the user to select a horizontal image or a vertical image.

Figure 17:
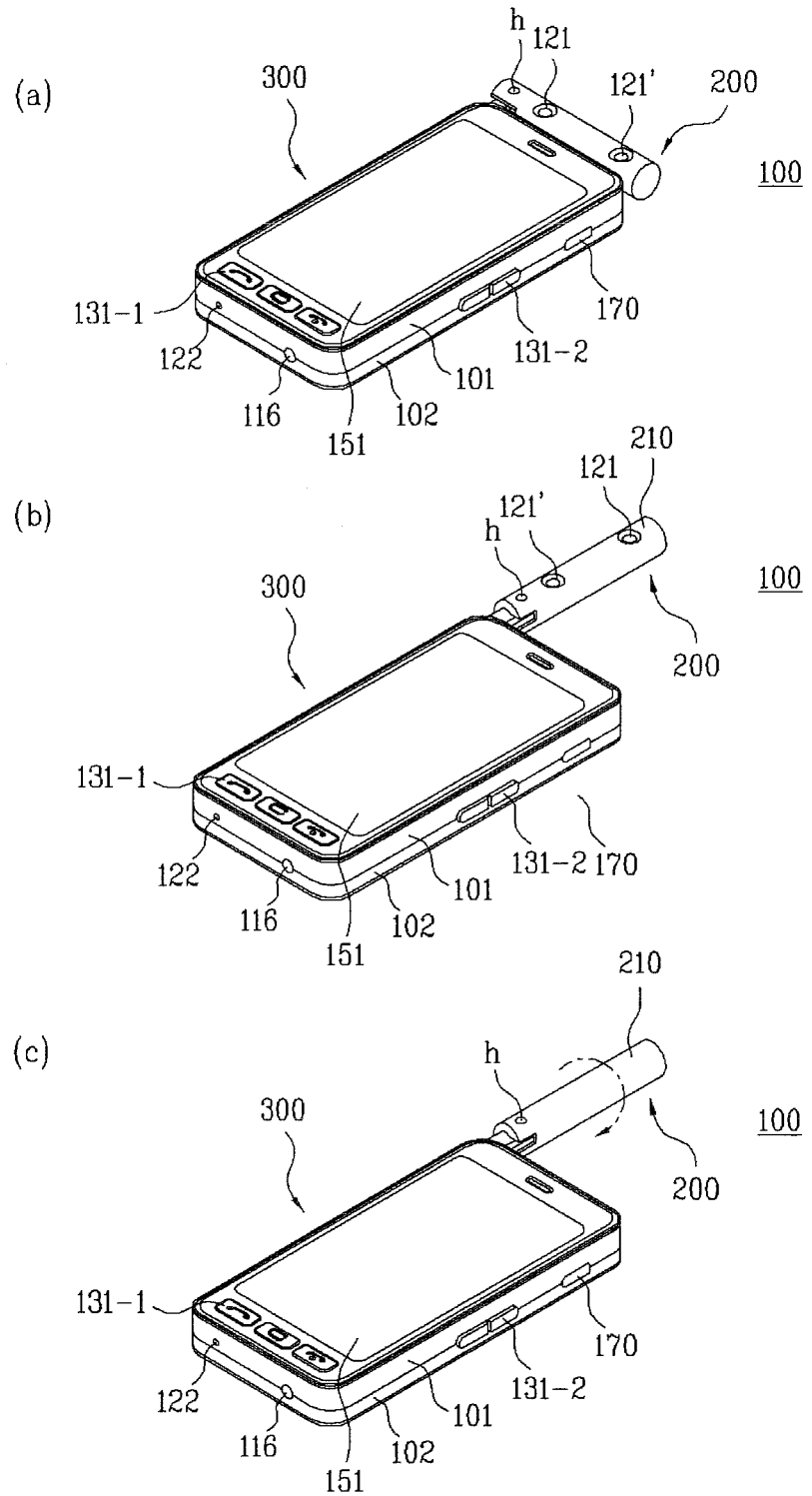
FIG. 17 is a diagram for another example of a mobile terminal 100 according to another embodiment of the present invention.

FIG. 17 is a diagram for another example of a mobile terminal 100 according to another embodiment of the present invention. In particular, FIG. 17(*a*) is a front perspective diagram of a mobile terminal according to the present embodiment, in which a photographing unit 200 of the mobile terminal is folded next to a body 300. FIG. 17(*b*) is a front perspective diagram of a mobile terminal according to the present embodiment, in which a photographing unit 200 of the mobile terminal is unfolded from a body 300. And, FIG. 17(*c*) is a front perspective diagram of a mobile terminal according to the present embodiment, in which a photographing unit 200 of the mobile terminal is rotated after unfolded from a body 300.

Unlike the former embodiment shown in FIG. 14, the embodiment shown in FIG. 17 may relate to a mobile terminal specified for photographing a vertical image 3-dimensionally.

According to the embodiment shown in FIG. 17(*a*), a photographing unit 200 is folded in a top direction of a body 300 of the mobile terminal 100. Therefore, it is able to photograph a photographer in a vertical direction in case of self-photographing. And, a display unit 151 is able to display a photographed vertical image 3-dimensionally. In particular, since a 3D photographing is enabled without unfolding the photographing unit 200, the mobile terminal is specified for photographing a vertical image. In a photographing mode shown in FIG. 17(*b*), a photographing unit 200 for self-photographing a horizontal image is unfolded in a horizontal direction. And, FIG. 17(*c*) shows a case that a horizontal image of an object in front is photographed.

Consequently, the mobile terminal shown in FIG. 14 needs not to unfold the photographing unit 200 in case of photographing a horizontal image. According to the embodiment shown in FIG. 17, in case of photographing a vertical image, it is unnecessary to unfold the photographing unit 200.

Therefore, the mobile terminal shown in FIG. 14 corresponds to a case that the mobile terminal is specified for a horizontal image photographing. And, the mobile terminal shown in FIG. 17 corresponds to a case that the mobile terminal is specified for a vertical image photographing.

Figure 18:
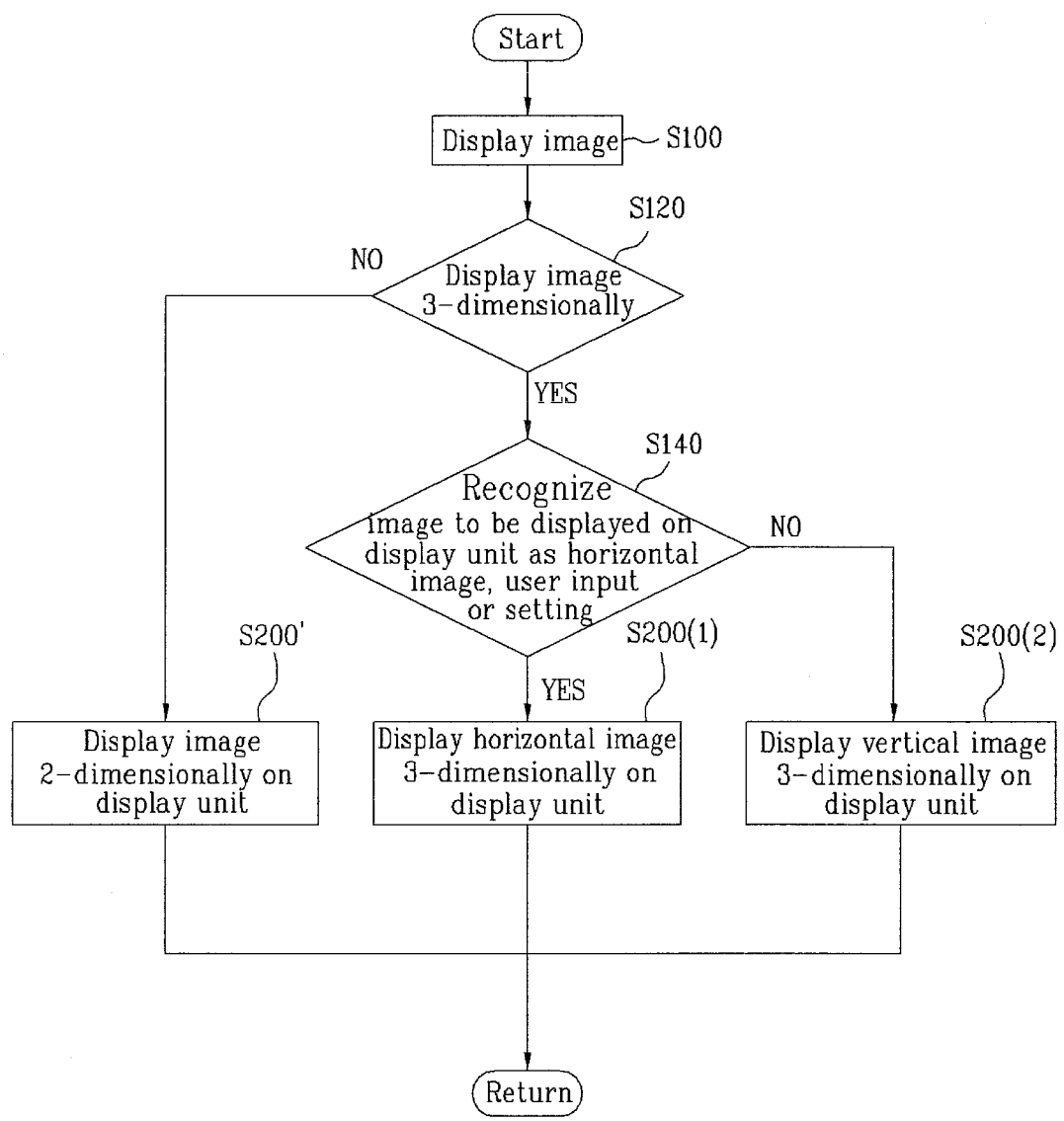
FIG. 18 is a flowchart for a method of controlling a mobile terminal 100 according to another embodiment of the present invention.

FIG. 18 is a flowchart for a method of controlling a mobile terminal 100 according to another embodiment of the present invention.

Referring to FIG. 18, the display unit 151 of the mobile terminal is able to display an image photographed by the photographing unit 200 or an image stored in the memory [S100]. In this case, if the photographed image is a 3D image or can be displayed as a 3D image, it is determined whether to display an image 3-dimensionally according to a setting or a user input [S120]. If the image is determined to be displayed as a 2D image, it is able to display the image 2-dimensionally on the display unit 151 [S200'].

In the step S120 of determining whether to display the image 3-dimensionally, if the image is determined to be displayed 3-dimensionally, it is necessary to determine whether the image to display 3-dimensionally is a horizontal image or a vertical image.

As mentioned in the foregoing description, since the display unit 151 of the mobile terminal according to the present embodiment is cable of a horizontal 3D image display and a vertical 3D image display both, the horizontal image and the vertical image should be displayed in a manner of being discriminated from each other.

Therefore, as mentioned in the foregoing description, it is able to determine whether the photographed or stored image is the horizontal image or the vertical image according to the connected angle between the body 300 of the mobile terminal 100 and the photographing unit 200 in the course of photographing an image. And, it is also able to determine a horizontal image or a vertical image according to a user selection or setting.

After it has been determined to display the image 3-dimensionally on the display unit 151 [S120], if the image to display is recognized as the horizontal image or is determined as the horizontal image according to the user input or setting [S140], the display unit 151 3-dimensionally displays the horizontal image on the assumption that the displayed image is the horizontal image.

If the image to display is recognized as the vertical image or is determined as the vertical image according to the user input or setting [S140], the display unit 151 3-dimensionally displays the vertical image on the assumption that the displayed image is the vertical image.

Mobile Terminal Informing User of 3D Level

According to a further embodiment of the present invention, in photographing each image for both eyes for a 3D stereoscopic image using the mobile terminal having at least two cameras described with reference to one embodiment and another embodiment of the present invention, a method of informing a user of an extent of a stereoscopic effect of a subject (i.e., a 3D level or a 3D depth), and mobile terminal for implementing the same are provided.

A 3D level of a displayed object may be determined based on a relative position of the first image and the second image displayed on the display. A 3D level of a displayed object may also be determined based on a distance between the first image and the second image on the display.

When images for both eyes for a 3D stereoscopic image are photographed, although a preview function of a 3D stereoscopic image type is provided via a display unit capable of implementing a 3D stereoscopic image of a mobile terminal is provided, if a controller 180 informs a user of a 3D level of a subject, a photographing can be more accurately performed. Moreover, if a mobile terminal is provided with a display unit incapable of implementing a 3D stereoscopic image or a 3D stereoscopic image implementing function is deactivated due to such a reason as a quick photographing and the like, the present function is more useful.

For clarity and convenience, in the following description, a mode for photographing each image for both eyes for a 3D stereoscopic image using at least cameras provided to a mobile terminal according to the present invention shall be named a 3D photographing mode.

First of all, a method of displaying a 3D level according to a further embodiment of the present invention is explained with reference to FIG. 19 as follows.

Figure 19:
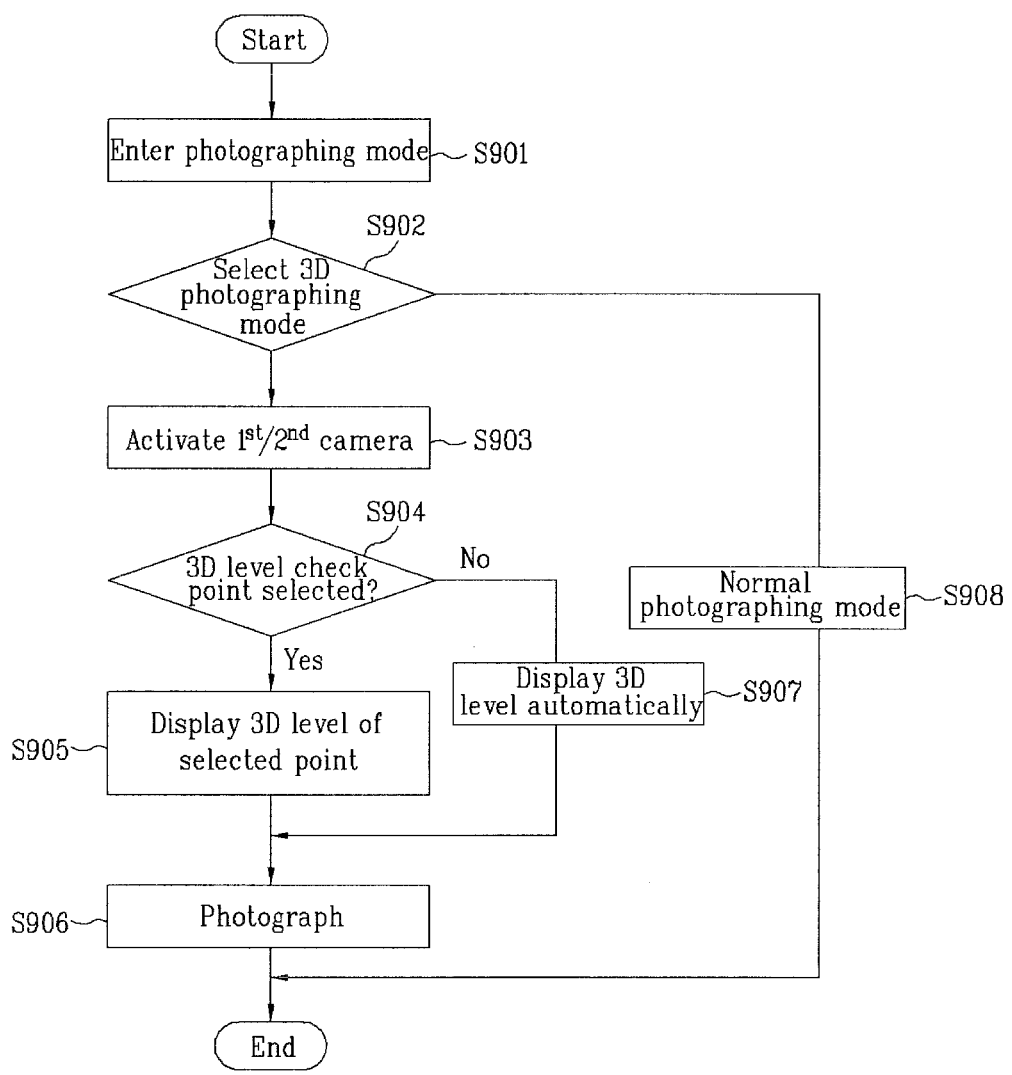
FIG. 19 is a flowchart for a method of displaying a 3D level of a subject in case of executing a 3D photographing mode in a mobile terminal 100 according to another embodiment of the present invention.

FIG. 19 is a flowchart for a method of displaying a 3D level of a subject in case of executing a 3D photographing mode in a mobile terminal 100 according to another embodiment of the present invention.

Referring to FIG. 19, a photographing mode using a camera can be entered according to a prescribed user's menu manipulation via the user input unit 130 [S901].

Afterwards, the user is able to select whether to perform a 3D photographing mode or a normal photographing (e.g., a random photographing mode except the 3D photographing mode) via the mobile terminal 100 [S902].

If the user selects the normal photographing, a normal photographing mode according to a setting of the normal photographing can be performed [S908]. If the user selects the 3D photographing mode, the first camera and the second camera are activated [S903].

Of course, in case that at least three cameras are provided to the mobile terminal, the rest of the cameras can be activated according to a setting.

Afterwards, a preview function for showing images photographed via the first and second cameras to the user is performed via the display unit 151. It is then able to select a specific point or subject of which 3D level is intended to be obtained [S904].

This selection can be achieved in a manner of applying a touch input to a specific point for a check if the display unit includes a touchscreen. Alternatively, the selection can be made via such a prescribed command input via the user input unit 130 as a navigation key manipulation and the like.

The controller 180 measures the 3D level of the point selected by the user and then enables the display unit to display the measured 3D level in various forms [S905].

In doing so, in order to measure the 3D level, such a measure as a contrast comparison, a distance measuring mode, a binocular image comparison and the like is available. This shall be described in detail later.

In order to inform the user of the 3D level measured via at least one of the above measures, the controller 180 is able to use at least one of a numeral, a graph, a figure and a combination thereof.

In particular, an upper limit of the 3D level can be set to a distance, which is remote enough for a user to sense a stereoscopic effect substantially, or a distance predetermined by a user. And, a lower limit of the 3D level can be set to a minim focal distance of a camera or a distance predetermined by a user. A range between the determined upper and lower limits is divided into a plurality of sections by a prescribed unit. And, different numerals, characters, colors, a combination thereof and the like can be set to match the sections, respectively. If a distance of a subject is out of the upper or lower limit, the controller 180 controls a separate warning message and/or a separate warning sound to be outputted.

If the user does not perform a special selection, the controller 180 is able to automatically display the 3D level information of the specific point or subject [S907].

For example of selecting the target for displaying the 3D level information automatically, the controller 180 is able to display 3D level information of a point recognized as a face from a preview image using a face recognizing function. For another example, the controller 180 is able to display the 3D level information of a closest-located subject.

The user checks the 3D level of the subject and is then able to perform the photographing by manipulating a virtual shutter button or a hardware shutter button [S906].

In the following description, a method for the controller 180 to determine a 3D level in a 3D photographing mode according to the present invention is described.

First of all, as mentioned in the foregoing description, when a 3D stereoscopic image is displayed using binocular images of a subject photographed by leaving the binocular disparity, the 3D level is the information indicating an extent of a stereoscopic effect given to the subject in the 3D stereoscopic image. This 3D level depends on a distance between a photographing camera and a subject.

Hence, 1) if the mobile terminal is provided with a distance sensor for measuring a distance between a camera and a subject, the controller 180 is able to determine the 3D level according to the subject distance determined by the distance sensor. Yet, in this case, it is disadvantageous in that a measured point (hereinafter named a measured distance point) is fixed to a preview image according to a position at which the distance sensor is fixed and arranged on the mobile terminal.

2) As a method of determining a 3D level of a subject, it is able to use a method of comparing binocular images to each other. This is explained with reference to FIGS. 20A to 21 as follows.

Figure 20A:
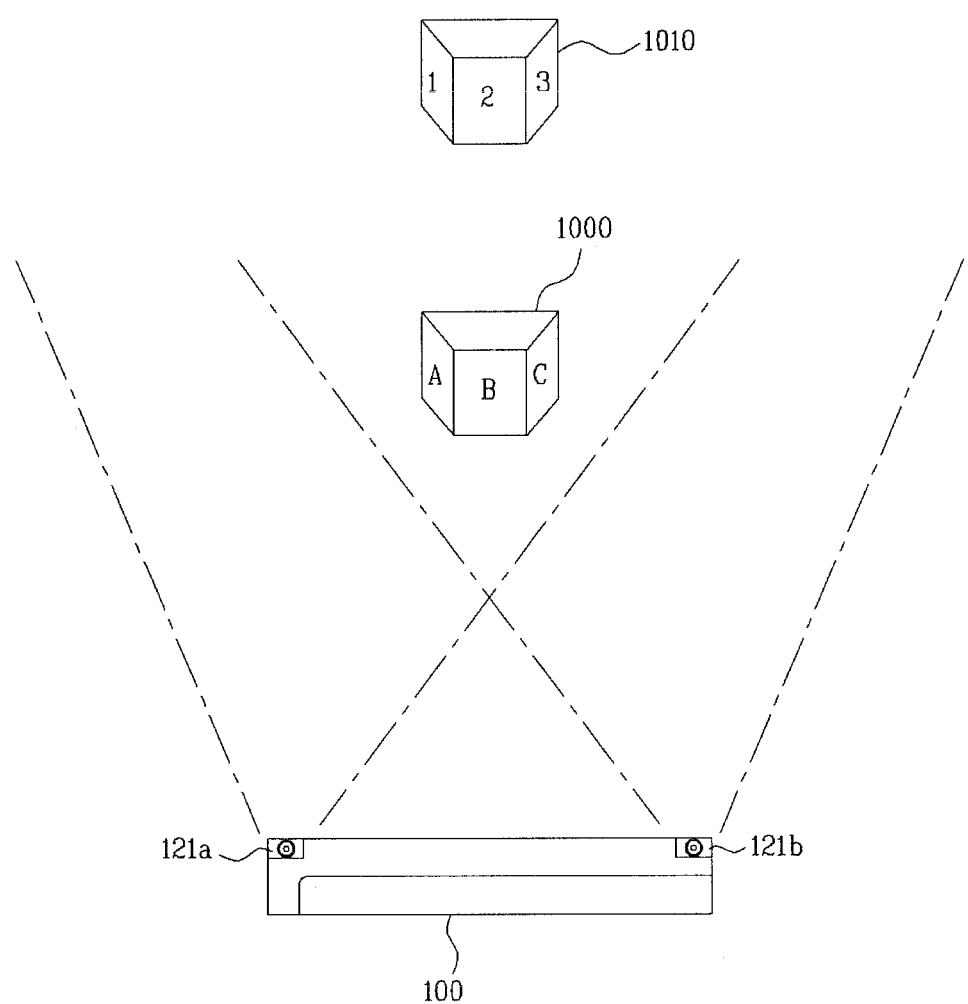

FIGS. 20A to 20C are diagrams for images photographed via a binocular camera in accordance with a distance of a subject according to a further embodiment of the present invention, in which each image photographed via binocular cameras according to a distance of a subject is shown. FIG. 21 is a diagram of images generated from overlapping the images photographed via the binocular camera shown in FIG. 20B and FIG. 20C with each other according to a further embodiment of the present invention.

First of all, referring to FIG. 20(a), in a mobile terminal 100 having at least two cameras according to the present invention, assume a case that a first camera 121a for photographing a left eye image and a second camera 121b for photographing a right eye image are arranged in the same direction to perform a 3D photographing mode. In this case, when a first subject 100 in a trapezoid pillar shape closer to the mobile terminal 100 is photographed, the left eye image and the right eye image can have the shapes shown in FIG. 20B, respectively. Moreover, when a second subject 1010 having the same shape of the first subject 1000 by being farther located than the first subject 1000 is photographed, the left eye image and the right eye image can have the shapes shown in FIG. 20C, respectively.

Comparing FIG. 20B and FIG. 20C to each other, FIG. 20B shows the result of photographing the first subject 100 located closer than the second subject 1010. Hence, there is a considerable difference between the left eye image and the right eye image. On the contrary, a difference between the left eye image and the right image in FIG. 20C is not relatively greater than that of the case shown in FIG. 20B.

If both of the left and right eye images are viewed by being overlapped with each other, an image shown in FIG. 21 can be formed.

FIG. 21(a) shows the image generated from overlapping the left and right eye images shown in FIG. 20B with each other. And, FIG. 21(b) shows the image generated from overlapping the left and right eye images shown in FIG. 20C with each other. Like the difference generated between FIG. 21(a) and FIG. 21(b), a subject having a low 3D level (i.e., a greater stereoscopic effect) has a relatively big difference of the binocular image. On the contrary, a subject having a high 3D level has a relatively small difference of the binocular image.

Using this principle, the controller 180 compares the left eye image photographed via the first camera and the right eye image photographed via the second camera to each other, compares an extent of the subject difference, and is then able to determine the 3D level of the corresponding subject.

3) As a method of determining a 3D level of a subject, it is able to use a method of measuring a distance using a contrast difference according to a focal distance of a camera lens. In photographing a subject via a first camera and/or a second camera, the controller 180 activates a lens to match a focus. In this case, a part corresponding to a focused zone looks clear to raise its contrast. On the contrary, an unfocused part looks unclear to lower its contrast. Using this principle, the controller 180 measures a distance corresponding to a maximum contrast by calculating a contrast variation according to a focus change of a point of which 3D level is to be determined and is then able to display the 3D level corresponding to the measured distance.

In the following description, a detailed type for displaying a 3D level on a preview image provided via the display unit 151 is explained.

Figure 22:
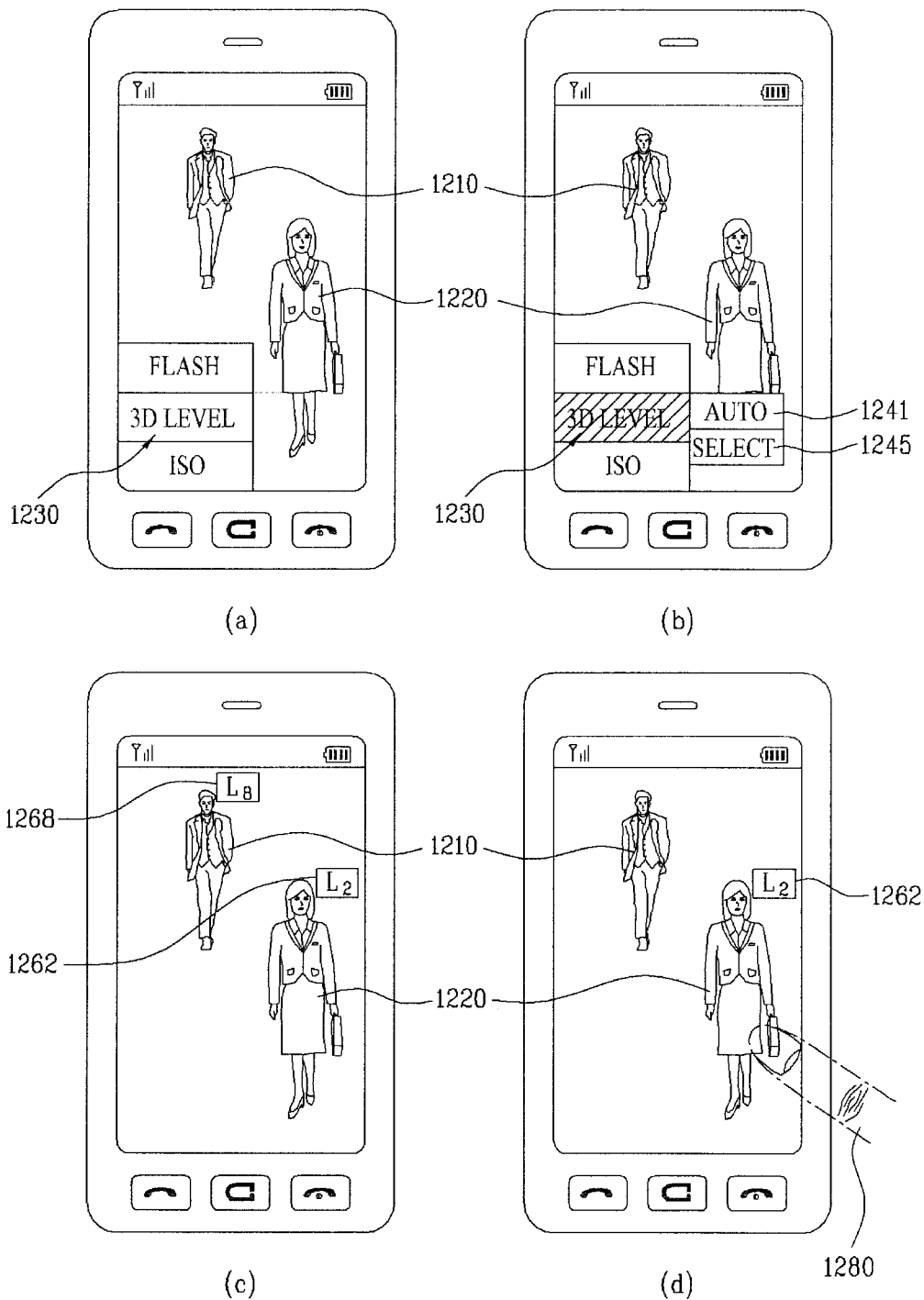
FIG. 22 is a diagram of screen configurations for one example of a type for displaying a 3D level of a subject in a mobile terminal according to a further embodiment of the present invention.

FIG. 22 is a diagram of screen configurations for one example of a type for displaying a 3D level of a subject in a mobile terminal according to a further embodiment of the present invention.

Referring to FIG. 22, assume a case that two subjects located in different distances from the mobile terminal 100 are photographed. In particular, one subject is a male 1210 and the other subject is a female 1220 located closer to the mobile terminal 100 than the male 1210, for example.

Referring to FIG. 22(*a*), as a 3D photographing mode is selected, if a first camera and a second camera are activated, a preview image including an image of a subject is displayed on a display unit of a mobile terminal. Afterwards, a user is able to select a 3D level menu 1230 via a prescribed menu manipulation.

Accordingly, a submenu of the 3D level menu 1230, as shown in FIG. 22(*b*), can be displayed. If an automatic display (Auto) menu 1241 is selected, a 3D level 1262 and a 3D level 1268 can be displayed for subjects according to a prescribed reference, as shown in FIG. 22(*c*), respectively. In doing so, if a face recognizing function is applied, a figure (no shown in the drawing) indicating a face recognition activation can b additionally marked on a face of the corresponding subject. Since the female subject 1220 is located closer to the mobile terminal than the male subject 1210, it has a lower 3D level.

If a manual selection (select) menu 1245 is selected in FIG. 22(*b*), it is able to display a 3D level 1262 of the subject 1220 displayed at a point touched by a user, as shown in FIG. 22(*d*).

Figure 23:
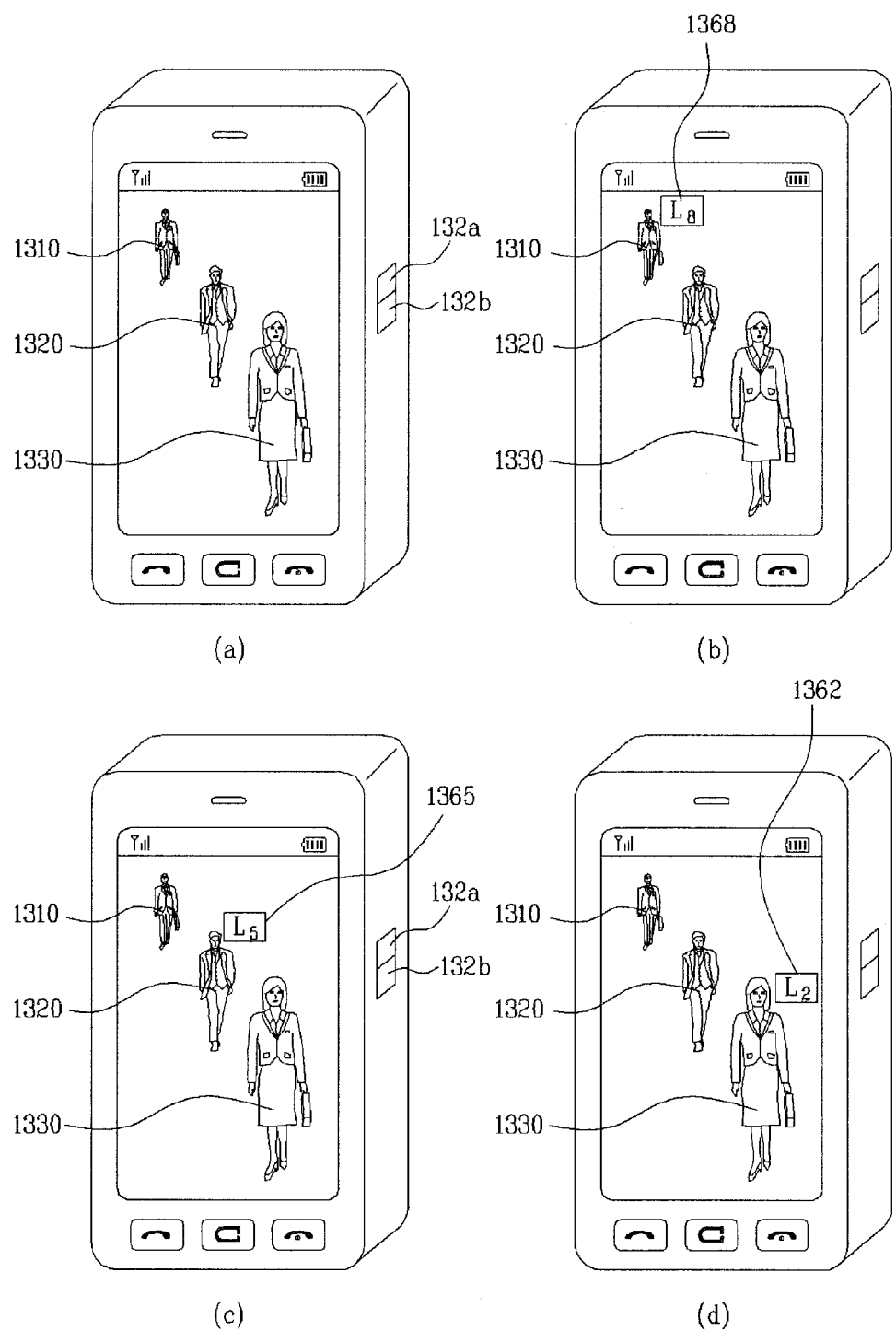
FIG. 23 is a diagram of screen configurations for another example of a type for displaying a 3D level of a subject in a mobile terminal according to a further embodiment of the present invention.

FIG. 23 is a diagram of screen configurations for another example of a type for displaying a 3D level of a subject in a mobile terminal according to a further embodiment of the present invention.

Referring to FIG. 23, assume a case that 3 subjects 1310, 1320 and 1330 located in different distances from the mobile terminal 100 are photographed. In this case, two hardware key buttons 132*a* and 132*b* are provided to one surface of the mobile terminal and can be used to change a subject of which 3D level is displayed.

For instance, a 3D level of each subject can be displayed in order of a higher level to a lower level from FIG. 23(*b*) to FIG. 23(*d*) via FIG. 23(*c*) to correspond to a count of pressing the key button 132*b* indicating a down direction.

In this case, the above-mentioned key button can be replaced by a virtual key button displayed on a touchscreen as well as the hardware key button. And, it is able to change a reference (e.g., an order of a low 3D level, a clockwise/counterclockwise arrangement order, etc.) for changing an order of displaying a 3D level according to a pushed key button.

Moreover, the 3D level display type is described as displaying a numeral indicating a 3D level within a block in FIG. 22A or FIG. 23 for example, by which the present invention is non-limited. Optionally, the 3D level can be displayed in one of various forms.

In accordance with at least one example embodiment, a method may be provided for controlling a mobile terminal. The method may include storing a first image of an object from a first camera, storing a second image of the object from a second camera, and determining a distance d between the first camera and the second camera when the first camera and the second camera obtain the first image and the second image of the object at a same time. The method may also include varying the distance d between the first camera and the second camera, and displaying a combination of the first image and the second image to allow a perceived three-dimensional (3D) image of the object.

In a first mode of the mobile terminal, the distance d between the first camera and the second camera is greater than the distance d between the first camera and the second camera in a second mode of the mobile terminal.

In the first mode, the distance d between the first camera and the second camera is greater than 1.5 inches and is less than 2.5 inches when the 3D image is to be displayed on the display of the mobile terminal.

In the second mode, the distance d between the first camera and the second camera is less than 1.5 inches when the 3D image is to be displayed on the display of the mobile terminal or on a display of a television.

The distance d between the first camera and the second camera is greater than 1.5 inches and is less than 2.5 inches when the 3D image is to be displayed on the display of the mobile terminal, and the distance d between the first camera and the second camera is less than 1.5 inches when the 3D image is to be displayed on the display of the mobile terminal or on a display of a television.

The method may also include displaying information of a 3D level of an object displayed within the combination of the first image and the second image. The information of the 3D level may be displayed in real-time while the first image and the second image are being obtained. The information of the 3D level may be displayed in real-time when the first image and the second image are obtained.

The distance may be stored in a storage device of the mobile terminal.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a first camera to obtain a first image of an object;
a second camera to obtain a second image of an object, the second camera being separated from the first camera by a distance d;
a controller to determine the distance d between the first camera and the second camera when the first camera obtains the first image of the object at a same time that the second camera obtains the second image;
a varying device to allow the distance d between the first camera and the second camera to vary; and
a display unit to display a combination of the first image and the second image to allow a perceived three-dimensional (3D) image of the object,
wherein in a first mode of the mobile terminal, the distance d between the first camera and the second camera is greater than the distance d between the first camera and the second camera in a second mode of the mobile terminal, and
wherein the first mode of the mobile terminal is for displaying the 3D image on the display unit, and the second mode of the mobile terminal is for displaying the 31) image on an external display, the external display being larger than the display unit,
wherein the varying device includes a link member,
wherein the first camera is loaded using the link member provided rotatable in an accommodating space of a housing of the mobile terminal, and
wherein the link member includes a link shaft loaded in a thickness direction of the mobile terminal, and
wherein the first camera is provided with a rotational shaft in a vertical direction of the link shaft.

2. The mobile terminal of claim 1, wherein in the first mode of the mobile terminal, the distance d between the first camera and the second camera is greater than 1.5 inches and is less than 2.5 inches.

3. The mobile terminal of claim 1, wherein in the second mode of the mobile terminal, the distance d between the first camera and the second camera is less than 1.5 inches.

4. The mobile terminal of claim 1, wherein information of the distance is stored in a storage device of the mobile terminal.

5. The mobile terminal of claim 1, wherein the varying device moves the second camera relative to the first camera.

6. The mobile terminal of claim 1, wherein the first camera is to be provided with a rotational shaft in a vertical direction of the link shaft.

7. The mobile terminal of claim 1, wherein the display unit displays information of a 3D level of an object displayed within the combination of the first image and the second image.

8. The mobile terminal of claim 7, wherein the information of the 3D level is displayed in real-time while the first image and the second image are being obtained.

9. The mobile terminal of claim 7, wherein the information of the 3D level is displayed in real-time when the first image and the second image are obtained.

10. A mobile terminal comprising:
a storage device to store a first image of an object from a first camera and to store a second image of the object from a second camera;
a controller to determine a distance d between the first camera and the second camera when the first camera and the second camera obtain the first image and the second image of the object at a same time; and
a display unit to display a combination of the first image and the second image to allow a perceived three-dimensional (3D) image of the object,
wherein in a first mode of the mobile terminal, the distance d between the first camera and the second camera is greater than the distance d between the first camera and the second camera in a second mode of the mobile terminal, and
wherein the first mode of the mobile terminal is for displaying the 3D image on the display unit, and the second mode of the mobile terminal is for displaying the 3D image on an external display, the external display being larger than the display unit,
wherein the first camera is loaded using a link member provided rotatable in an accommodating space of a housing of the mobile terminal, and
wherein the link member includes a link shaft loaded in a thickness direction of the mobile terminal, and
wherein the first camera is provided with a rotational shaft in a vertical direction of the link shaft.

11. The mobile terminal of claim 10, wherein in the first mode of the mobile terminal, the distance d between the first camera and the second camera is greater than 1.5 inches and is less than 2.5 inches.

12. The mobile terminal of claim 10, wherein in the second mode of the mobile terminal, the distance d between the first camera and the second camera is less than 1.5 inches.

13. The mobile terminal of claim 10, wherein the first camera is to be provided with a rotational shaft in a vertical direction of the link shaft.

14. The mobile terminal of claim 10, wherein the display unit displays information of a 3D level of an object displayed within the combination of the first image and the second image.

15. The mobile terminal of claim 14, wherein the information of the 3D level is displayed in real-time while the first image and the second image are being obtained.

16. The mobile terminal of claim 14, wherein the information of the 3D level is displayed in real-time when the first image and the second image are obtained.

* * * * *